(12) United States Patent
Shibuya et al.

(10) Patent No.: US 11,914,349 B2
(45) Date of Patent: *Feb. 27, 2024

(54) APPARATUS, ENGINE, SYSTEM AND METHOD FOR PREDICTIVE ANALYTICS IN A MANUFACTURING SYSTEM

(71) Applicant: JABIL INC., St. Petersburg, FL (US)

(72) Inventors: Bruce Shibuya, St. Petersburg, FL (US); Abhishek, St. Petersburg, FL (US); Ralph Ross, St. Petersburg, FL (US)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/533,032

(22) Filed: Nov. 22, 2021

(65) Prior Publication Data

US 2022/0187812 A1 Jun. 16, 2022

Related U.S. Application Data

(63) Continuation-in-part of application No. 16/302,477, filed as application No. PCT/US2017/032962 on May 16, 2017, now Pat. No. 11,287,809.

(Continued)

(51) Int. Cl.
*G05B 19/418* (2006.01)
(52) U.S. Cl.
CPC .................. *G05B 19/41875* (2013.01); *G05B 2219/32194* (2013.01)
(58) Field of Classification Search
CPC .......... G05B 19/41875; G05B 19/4184; G05B 19/41885
See application file for complete search history.

(56) References Cited

U.S. PATENT DOCUMENTS 11,287,809 B2 * 3/2022 Shibuya ............... G05B 13/048
2007/0288414 A1 12/2007 Barajas et al.
(Continued)

FOREIGN PATENT DOCUMENTS

KR 20190106369 9/2019
WO 2013127958 9/2013
WO 2014009942 A1 1/2014

OTHER PUBLICATIONS

Mikos et al., A Combined Multi-Agent and Case-Based Reasoning Approach to Support Collaborative Nonconformance Problem Solving in the Thermoplastic Injection Moulding Process, Feb. 2010, International Journal of Computer Integrated Manufacturing, vol. 23, No. 2, pp. 177-194 (Year: 2010).*

(Continued)

*Primary Examiner* — Toan M Le
(74) *Attorney, Agent, or Firm* — Riverside Law LLP

(57) ABSTRACT

A predictive analytics apparatus, engine, system and method capable of providing real time analytics in a manufacturing system. The apparatus, engine, system and method may include a data input capable of receiving raw data output from at least one machine operable to effect the manufacturing system embodiments, and a processor associated with a computing memory and suitable for executing code from the computing memory. The code may comprise an adaptor capable of pushing the received raw data to one or more databases to processed data; an extractor capable of extracting the processed data from the one or more databases; predictive analytics capable of receiving the extracted processed data and applying thereto at least one predictive model comprised of target data for the at least one machine, and capable of providing feedback to the at least one machine to modify performance of the at least one machine based on the application of the at least one predictive model;

(Continued)

and a visualizer capable of providing at least a visualization of the feedback and of the performance.

20 Claims, 30 Drawing Sheets

Related U.S. Application Data

(60) Provisional application No. 62/337,006, filed on May 16, 2016.

(56) References Cited

U.S. PATENT DOCUMENTS

| | | |
|---|---|---|
| 2010/0023307 A1 | 1/2010 | Lee et al. |
| 2010/0152878 A1 | 6/2010 | Chu et al. |
| 2010/0191361 A1 | 7/2010 | McCready |
| 2011/0166688 A1 | 7/2011 | Moyne |
| 2016/0018796 A1 | 1/2016 | Lu |
| 2016/0078368 A1 | 3/2016 | Kakhandiki et al. |
| 2017/0140278 A1 | 5/2017 | Gupta |
| 2019/0278261 A1 | 9/2019 | Shibuya |
| 2022/0187812 A1 | 6/2022 | Shibuya |

OTHER PUBLICATIONS

International Search Report for PCT/US2017/032962, dated Aug. 21, 2017.
Written Opinion of the International Searching Authority for PCT/US2017/032962, dated Aug. 21, 2017.
International Preliminary Report on Patentability for PCT/US2019/032962, dated Aug. 21, 2017.
Extended European Search Report dated Feb. 25, 2020 in European Patent Application 17800038.6.
IEEE Xplore_Search_Results, Jan. 20, 2021, 1 pp. (Year: 2021).
Mikos et al., A Distributed System for Rapid Determination of Nonconformance Causes and Solutions for the Thermoplastic Injection Molding Process: A Case-Based Reasoning Agents Approach, Aug. 24-27, 2011, International Conference on Automation Science and Engineering, Trieste, Italy, pp. 755-760 (Year: 2011).
Vargas-Villamil F D et al, "A model predictive control approach for real-time optimization of reentrant manufacturing lines", Computers in Industry, Elsevier, Amsterdam, NL, (May 1, 2001), vol. 45, No. 1, doi:10.1016/S0166-3615(01)00080-X, ISSN 0166-3615, pp. 45-57, XP004242387.

\* cited by examiner

APPARATUS, ENGINE, SYSTEM AND METHOD FOR PREDICTIVE ANALYTICS IN A MANUFACTURING SYSTEM

CROSS-REFERENCE TO RELATED APPLICATIONS

The present disclosure is a Continuation-In-Part Application of U.S. application Ser. No. 16/302,477, filed Nov. 16, 2018, entitled: APPARATUS, ENGINE, SYSTEM AND METHOD FOR PREDICTIVE ANALYTICS IN A MANUFACTURING SYSTEM, which claims priority to PCT Application No. PCT/US2017/032962, entitled: "APPARATUS, ENGINE, SYSTEM AND METHOD FOR PREDICTIVE ANALYTICS IN A MANUFACTURING SYSTEM," filed May 16, 2017, which claims priority to U.S. Provisional Application No. 62/337,006, entitled "APPARATUS, ENGINE, SYSTEM AND METHOD FOR PREDICTIVE ANALYTICS IN A MANUFACTURING SYSTEM," filed May 16, 2016, the contents of which is incorporated by reference in its entireties herein.

BACKGROUND

Field of the Description

The present disclosure relates to analytics, and, more particularly, to an apparatus, engine, system and method for predictive analytics in a manufacturing system.

Description of the Background

In the present state of the art, manufacturing, particularly across lines and across facilities, employs any number of machines, dependent upon the product being manufactured. These machines, while generally capable of providing operational data, often provide that data in disparate and/or unstructured formats that make the data unsuitable for monitoring of the machines during the manufacturing process. Consequently, it is typically only after a process-breakdown, a lower-than-expected yield, or a functional decay of one or more machines that an issue in a line or in a facility is detected. That is, present issues in manufacturing are generally only detected after or as they occur.

Therefore, the need exists for an apparatus, engine, system and method of materials movement for predictive analytics in a manufacturing system.

BRIEF DESCRIPTION OF THE DRAWINGS

The accompanying drawings are included to provide a further understanding of the disclosed embodiments detailed herein. In the drawings, like numerals represent like elements, and.

DETAILED DESCRIPTION

Figure 1:
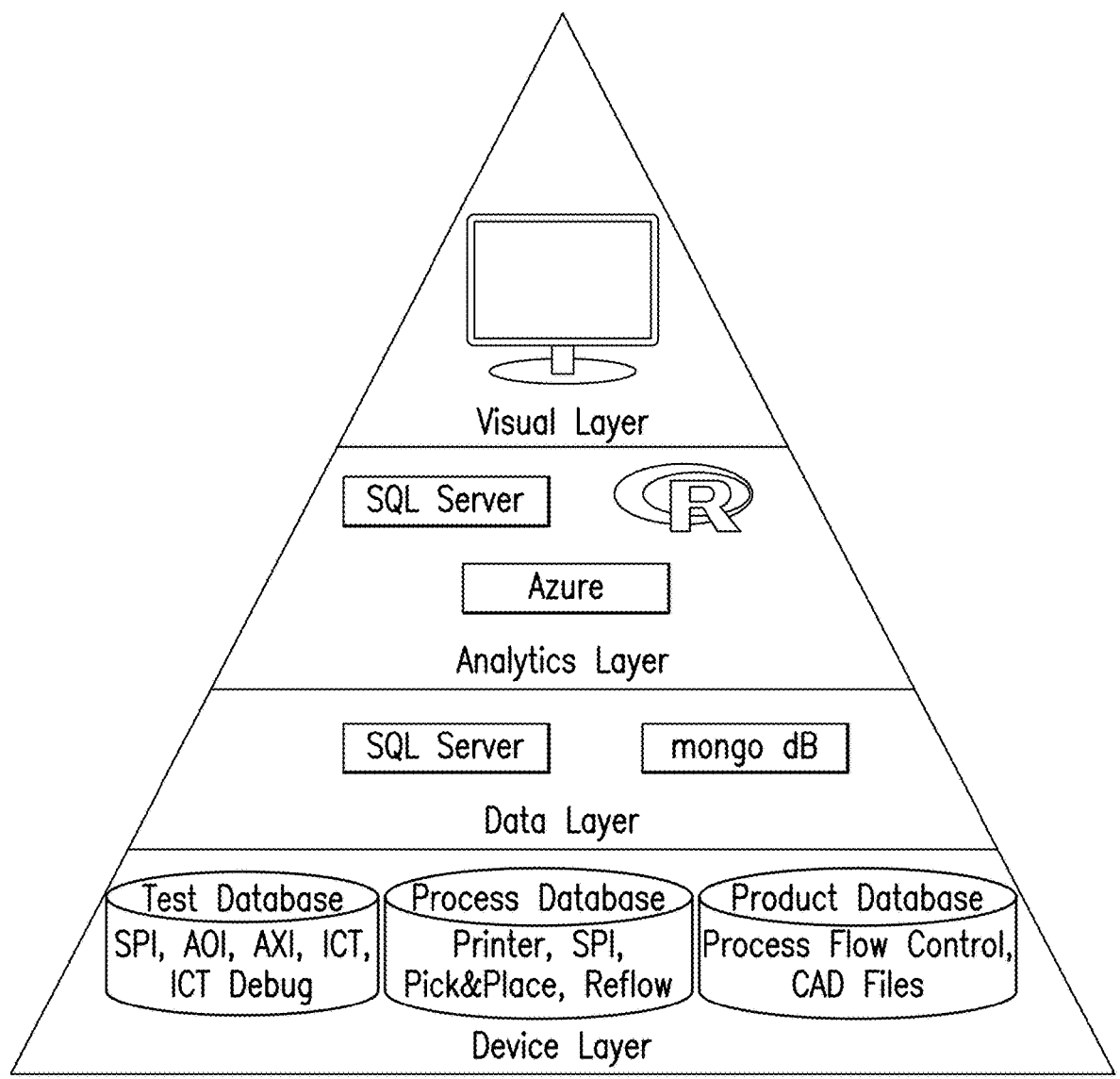
FIGS. 1-32 illustrate aspects of the embodiments.

The figures and descriptions provided herein may have been simplified to illustrate aspects that are relevant for a clear understanding of the herein described apparatuses, devices, systems, and methods, while eliminating, for the purpose of brevity and clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art or are evident from the discussion herein, and because they do not facilitate a better understanding of the present disclosure, a discussion of such elements and operations may not be provided herein. However, the present disclosure is deemed to include all such elements, variations, and modifications to the described aspects that would be known to those of ordinary skill in the art in light of the discussion herein.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may accordingly be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. For example, as used herein the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to", "coupled to", or like term in relation to another element or layer, it may be directly on, engaged, connected or coupled to the other element or layer, or intervening elements or layers may be present. In contrast, when an element is referred to as being "directly on," "directly engaged to", "directly connected to", "directly coupled to", or like term in relation to another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be used only to distinguish one element, component, region, layer or section from another element, component, region, layer or section. That is, terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

The disclosed embodiments use realtime machine learning data, which may be unstructured, with, for example, an adaptor, such as CAMx or Active X, in order to push realtime data to one or more databases, such as a SQL database and/or Mongo database, to allow for extraction to, for example, the analytics layer. Extraction to the analytics layer may allow for modeling, such as of supervised and/or unsupervised operations, which enables prediction of performance/failures/occurrences/triggers downstream. In short, raw machine-data text logs may be mined for conversion to structured data for analytics. Visualization of the modeling may allow for triggering of actions and/or reactions, such as via flow charts and decision/alert trees.

Accordingly, embodiments may include an approach that utilizes, for example, four layers of an OSI-type model. The four layers may include the device/machine unstructured data in a first layer; the structuring of that data in a second layer; analytics, such as including modeling/prediction, of the structured data in a third layer; and finally visualization of the analytics, such as to drive action, in a fourth layer. Such visualization may include, for example, reaction flow charts, such as to mitigate the source of the failure.

This multi-layer software application may be structured as two main components: a modeling framework and approach to build predictive models for product quality; and an integrated platform that enables model builds and execution in a global production environment. Thereby, the embodiments may provide predictive analytics that may impact, end to end, a supply chain. That is, embodiments may provide early warning of complete supply chain failures to prevent outflow to customers, all the way back to serial data acquisition from machines and machine-to-machine interfaces for traceability of early warning failures in a machine or line before they happen. Such predictive analytics may drive reduction of warranty claim cost, improve production yields, provide notification of proliferation throughout the supply chain of potential failures before they happen, increase production capacity, and improve component supplier quality levels to drive down accruals on warranty claims, among many other benefits.

Predictive analytics as applied to realtime machine data in order to model/predict failures before they occur downstream also improves production yields, and reduces scrap, work in process, and excess inventory, while also reducing energy consumption, eliminating back end tests, and increasing production capacity to customers. The end to end nature of the embodiments allows for application starting from the customer design, then to component suppliers, manufacturing, customer system and finally to customer warranty issues.

The defined data integration path provided by the embodiments allows for rapid analytics in production environment. These analytics may reduce downtime variably dependent upon the production environment in which the analytics/modeling are employed, such as by 25-40% in some environments, or 2-3 times or more in others, such as by modifying process parameters or operations to reduce eventual failures or to enhance efficiencies.

The modeling may alert to prospective first time fails or repeated fails, critical points or elements, and may thus provide improved machine availability, key uptime data points and early failure prediction. To allow for the modeling, various data manipulation may occur, such as: a data quality score card to identify poor structure of machine log format (data quality assurance allows for modeling to be enabled); a roll-up strategy, such as a 15 second roll-up, that time-stitches data, such as to overcome data aggregation hurdle that arises from data being collected at differing frequencies from different machines; a sequential dimension reduction strategy to identify parameters that impact downtime; clean up of variables; removal of variables with erroneous data or large sets of missing values; calculation of information value of certain data sets; evaluation of predictor importance to a model; logistic regression models that calculate percentage of importance in predicting response for each input variable; empirical parameter evaluation and feedback; use of raw data to identify fail rate trends across parameter distribution for variables or top priority variables identified by modeling. This type of data and parameter management, such as when focused in the lower failure region, may provide an opportunity to increase uptime significantly, such as between 10-30%. Increasing machine uptime may provide an opportunity to significantly increase production, such as by an entire day's worth of production within a week's time period, by way of non-limiting example.

The qualitative analysis of data discussed throughout allows for the connection of multiple machines/facilities, such as for big data collection. This also enables a self-improving manufacturing ecosystem. Accordingly, local and/or master/remote analytics dashboards may provide real-time information and analytics for one or more local or remote machines, lines and/or across one or more facilities.

FIG. 1 illustrates an exemplary four layer software solution. Included are a device layer, which may employ, for example, CAMx, VVTS, or the like; a data layer, which may employ Mongo dB, SQL Server, or the like; an analytics tools layer, which may employ MS Azure M-L, R, Discovery Module, or the like, and which may operate supervised or unsupervised learning module(s); and a visualization and reporting layer, which may employ Angular.js, MVC, SFM, or the like.

This software solution application may minimize yield loss and increase production capacity by providing tools to assist in automating the manufacturing process, which would otherwise have to be performed ad-hoc and by manual testing. By maximizing the operation of production line, the system may meet a site's business and operations requirements while remaining flexible and easy to understand, such as by providing logical User Interface akin to the dashboards discussed above.

More specifically, the software application may allow quality or work cell managers to direct and communicate with a group of manufacturing engineers/operators and site staff, such as to prevent production line failures and to publish system alerts on the shop floor and/or store on a data warehouse. The software application may facilitate near real-time production data communication between suppliers, operators, manufacturing engineers, production, and operations via electronic communication methods. The user interface screens discussed herein may be used in some or every stage of the development through the system to provide a uniform review of triggers-process alarms; the location, look and feel of these user interface screens may be configurable via the application's menu options and business segment requirements for products being produced. The software application system may also contain a relational database containing a list of operators, manufacturing engineers, operations, quality and component suppliers who may be integrated into an alerts protocol process.

The software application solution enables production lines with analytics capability that is fully integrated with a current plant shop floor systems. This delivers an integrated quality analytics solution that provides real or near-real time prediction of quality. The timeliness of the data and analytics may be further enhanced using known means, such as wherein the software application may avoid pulling real-time data from production databases (MES, SFM,) during predictive analytic data staging and aggregation to avoid high data transfer which could affect production data acquisition for operations.

The predictive analytics aspects of the software application may take upstream process inspection and control parameters and build predictive models for quality metrics. These models are then later used in predictive mode for new material that is being processed. This predictive ability predicts quality issues before they are detected in traditional control methods and enables benefits such as reduced scrap, reduced rework, managing inventory based on known propensity to quality issues, and improved customer satisfaction, along with other benefits.

The predictive analytics aspects of the software application may enable the discussed real-time machine data acquisition through various adaptors that live stream to Test or Mongo databases which may extract, transfer, and load for aggregation/staging of data. This may enable model learning that will score events that predict and trigger alarms. These events may be driven by reaction flow actions driven by the operators, test engineers, manufacturing engineers, work cell quality managers and work cell operations managers. The reaction flow charts may have a series of escalation points that will enable decisions to be made on production line stoppage, removal of products for failure analysis, notifications to suppliers in real-time of triggered excursions.

Figure 2:
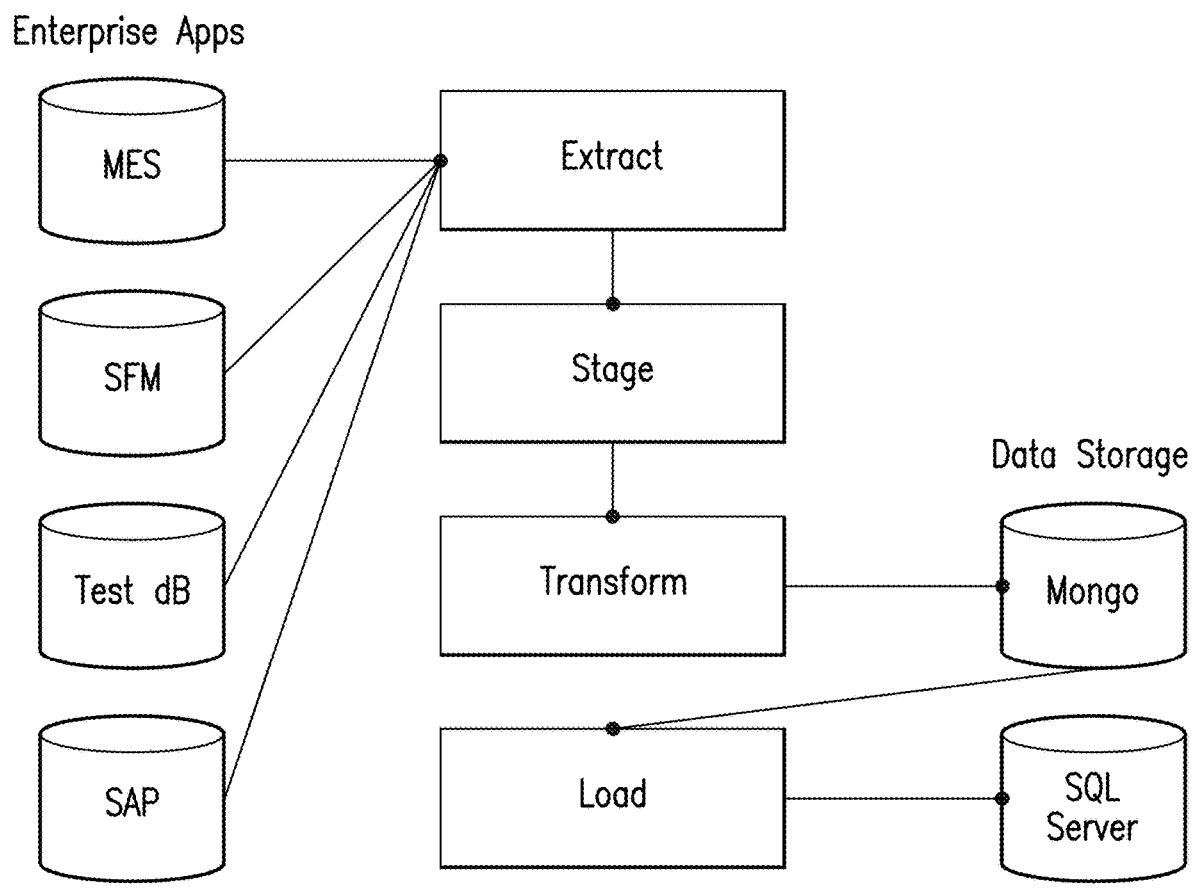
Figure 3:
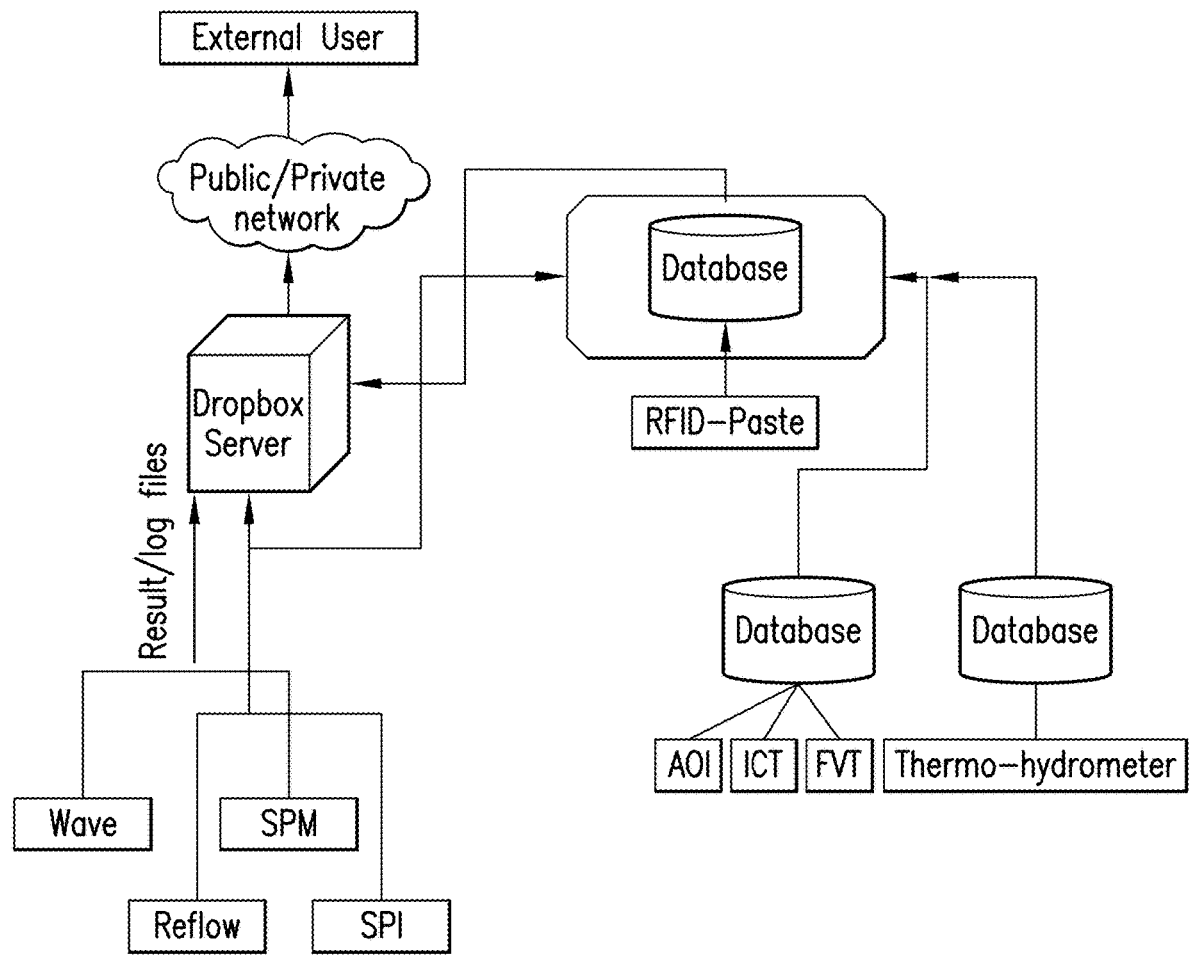

FIG. 2 is a block diagram illustrating an exemplary data flow and manipulation in accordance with the exemplary layers indicated in FIG. 1. As illustrated, loaded data may be transformed and ultimately extracted for accessibility to enterprise level applications. FIG. 3 further illustrates this interaction by indicating the loading of data from machine log files, whereby certain of the data is data based and/or otherwise manipulated prior to being extracted for availability to an ultimate user, such as via a public or private network.

Figure 4:
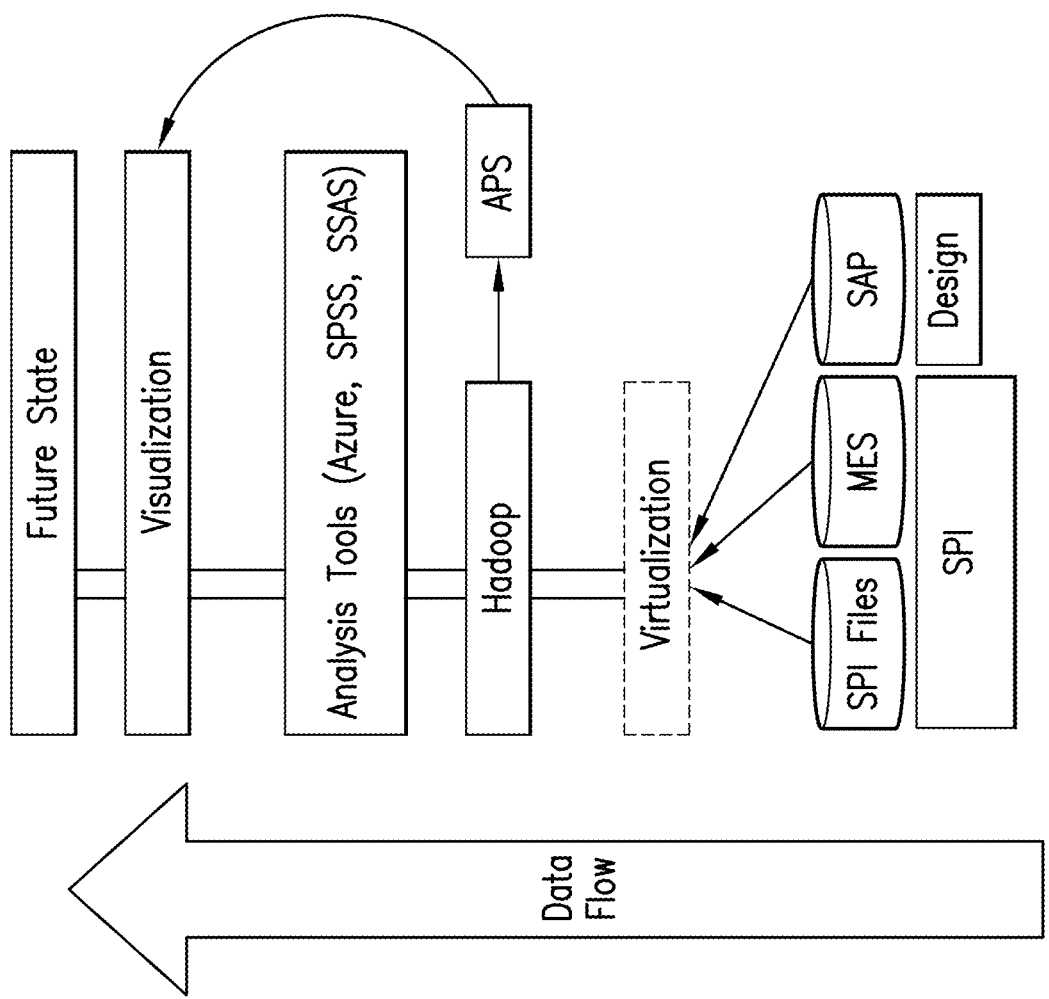
Figure 4:
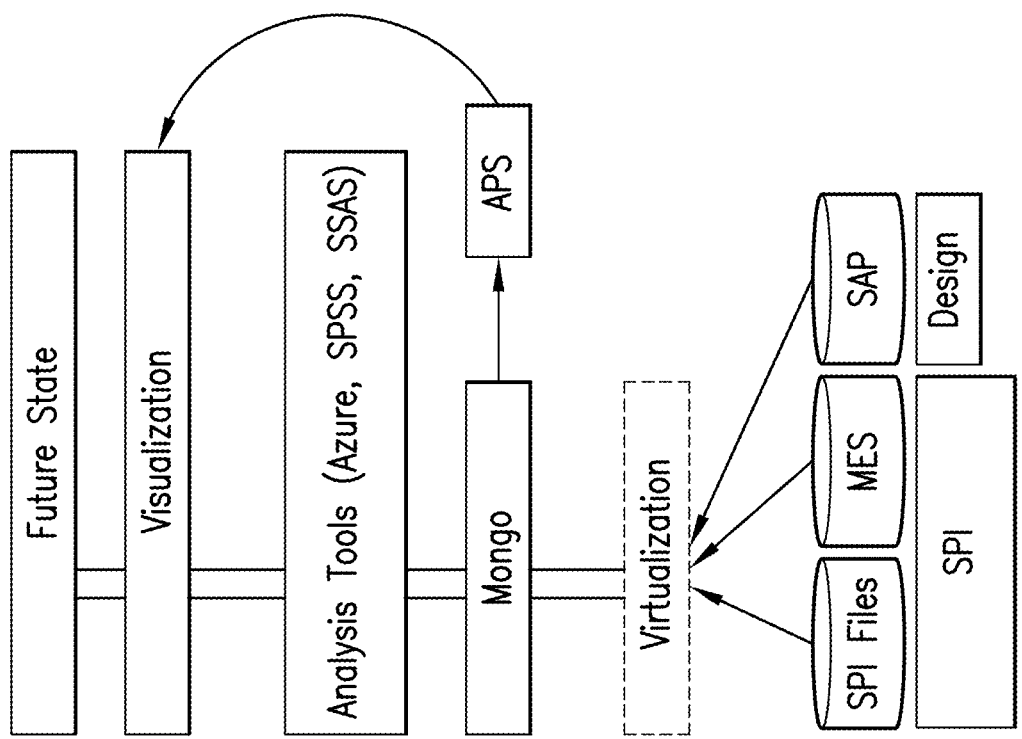

FIG. 4 illustrates an exemplary data flow through the data stack discussed with respect to FIG. 1. In the illustration, the data is databased as generated by the machines and machine interfaces, is thereafter manipulated to allow for analytics, is thereafter subjected to analytics in the form of analysis tools, and is thereafter visualized for generation of reporting and/or alerts. Of note, those skilled in the art will appreciate with respect to FIG. 4 that virtualization may not be separately needed in the flow illustrated.

The software application may be designed to trigger real-time alerts in the entire end to end supply chain to drive actions before excursions occur in the production line. Supervised learned models based on historical failures and un-supervised models based on limited historical data may be used to assess alerts. This system enables machine data to transfer learned knowledge to optimize equipment operation and prescriptively determine maintenance and calibration intervals.

Figure 5:
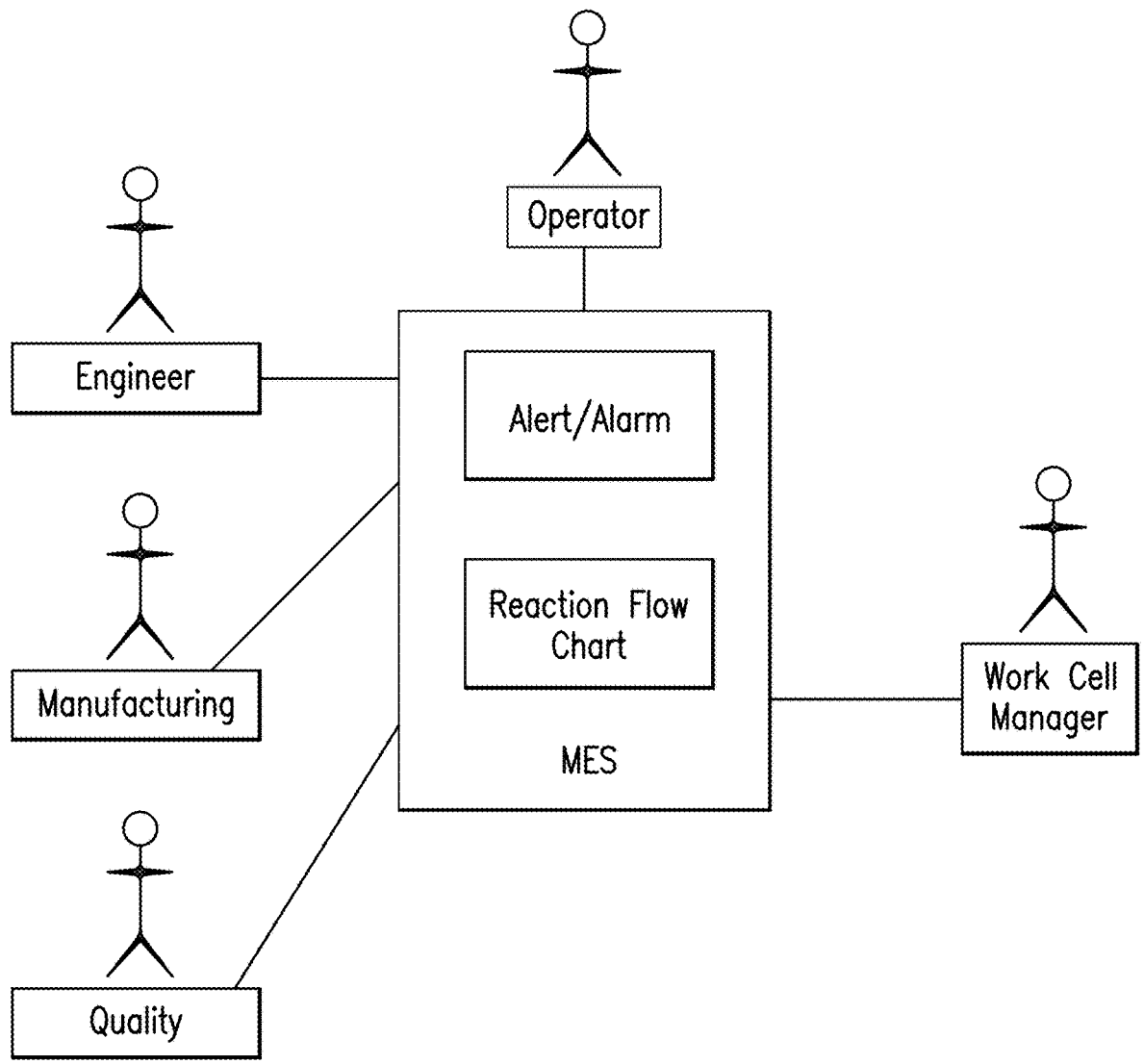
Figure 6:
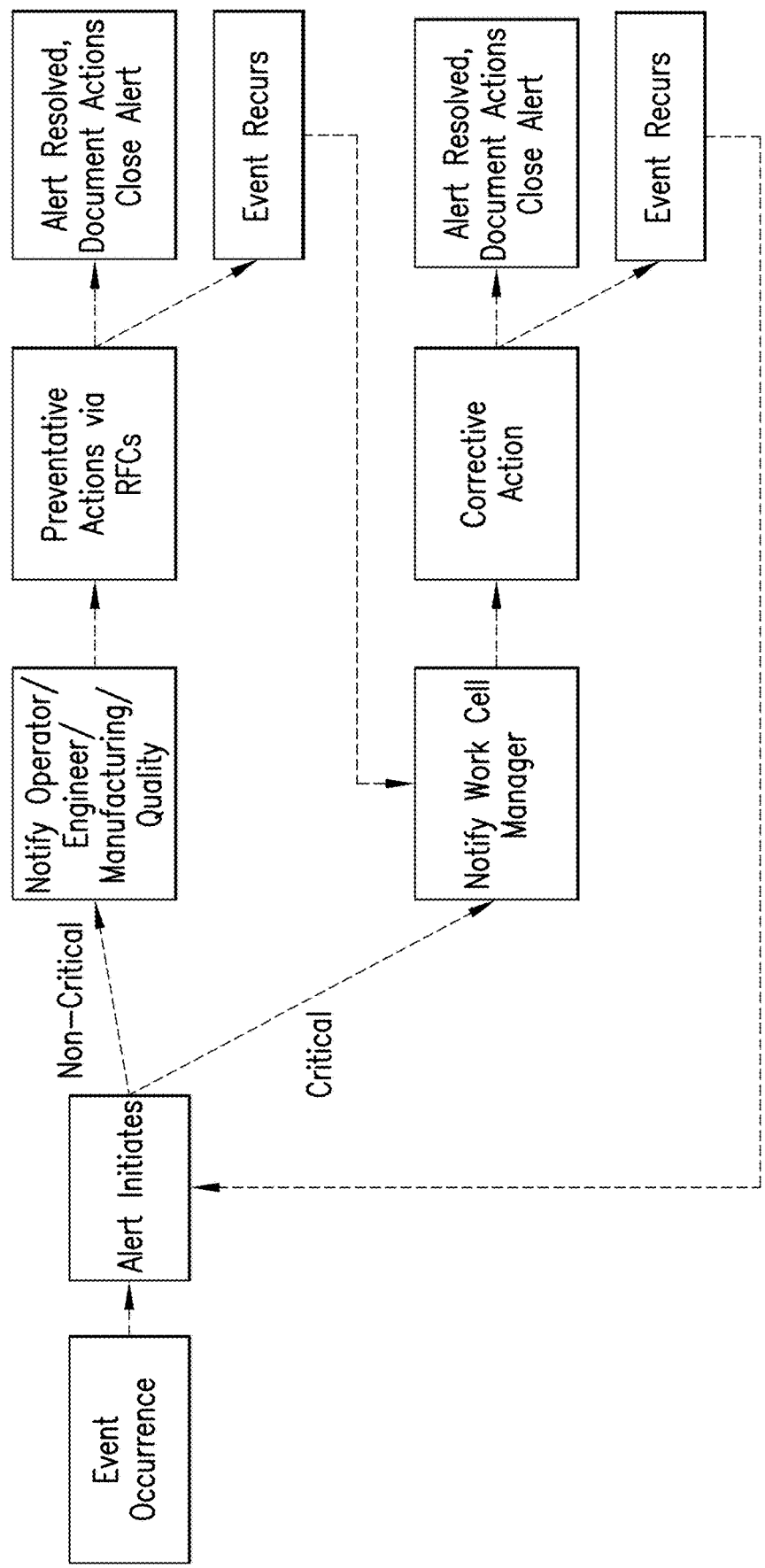

An exemplary alert system may have four active members and one cooperating system, as shown in FIG. 5. The operator, engineer, or manufacturing and quality may access the online alert system through WiFi/BlueTooth, Internet, IR, cellular or Intra-net, or via other known means. Other communication with the system may be through email/Text, for example. Persons having particular administrative levels of access, such as the work cell manager, may access the entire system directly, for example. Alerts to the various group members of a given alert group may flow as indicated in FIG. 6.

Figure 7:
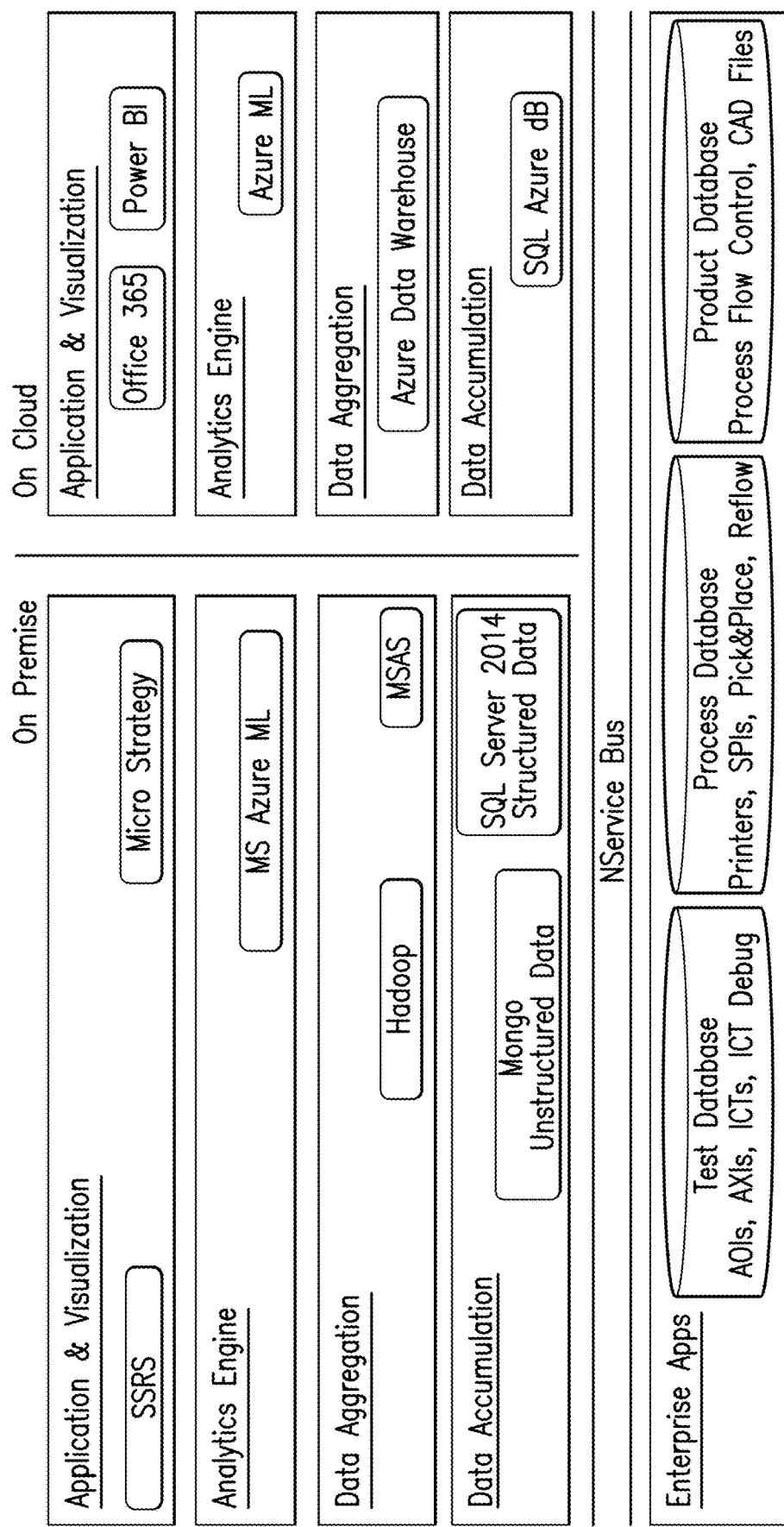
Figure 8:
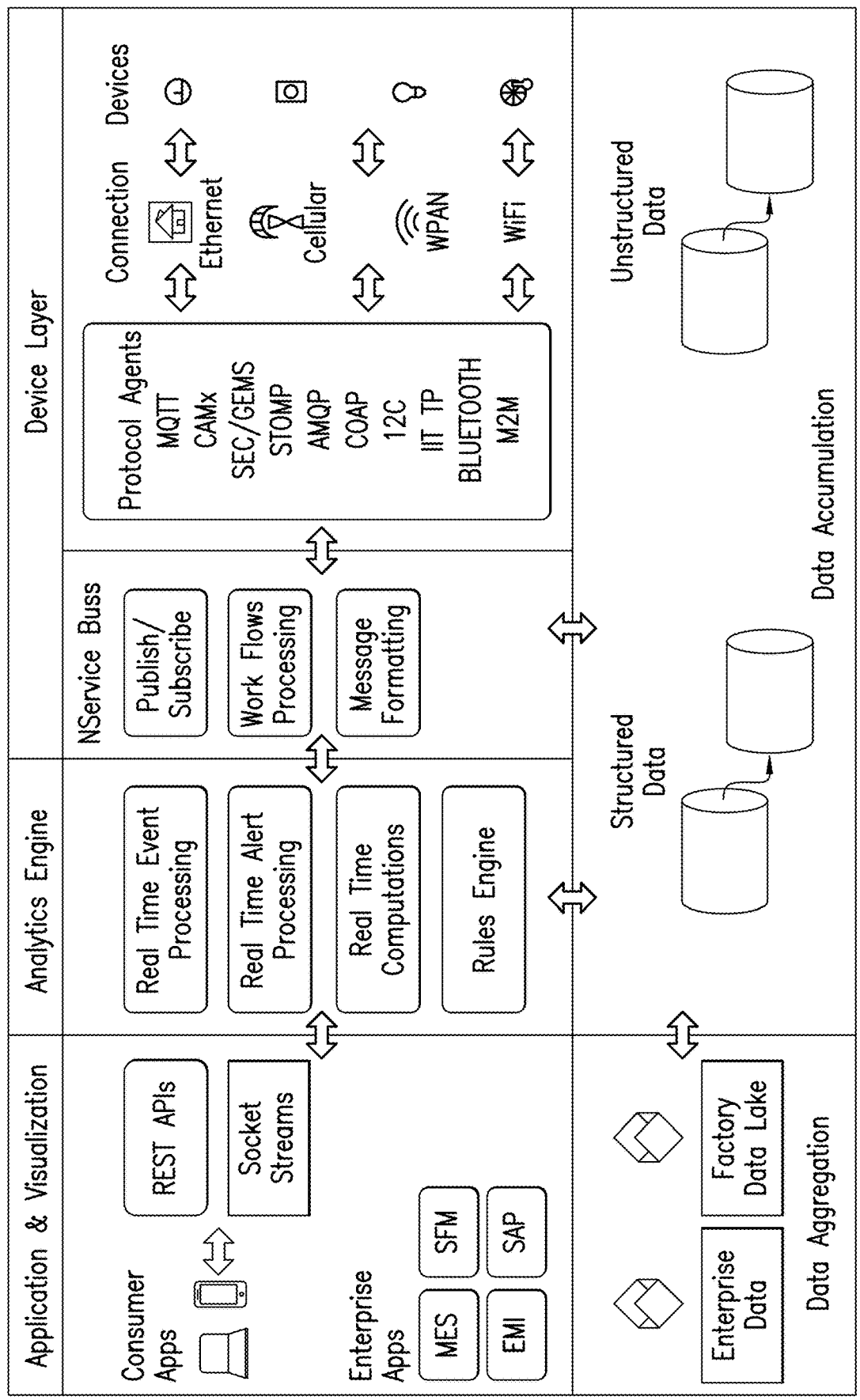
Figure 9:
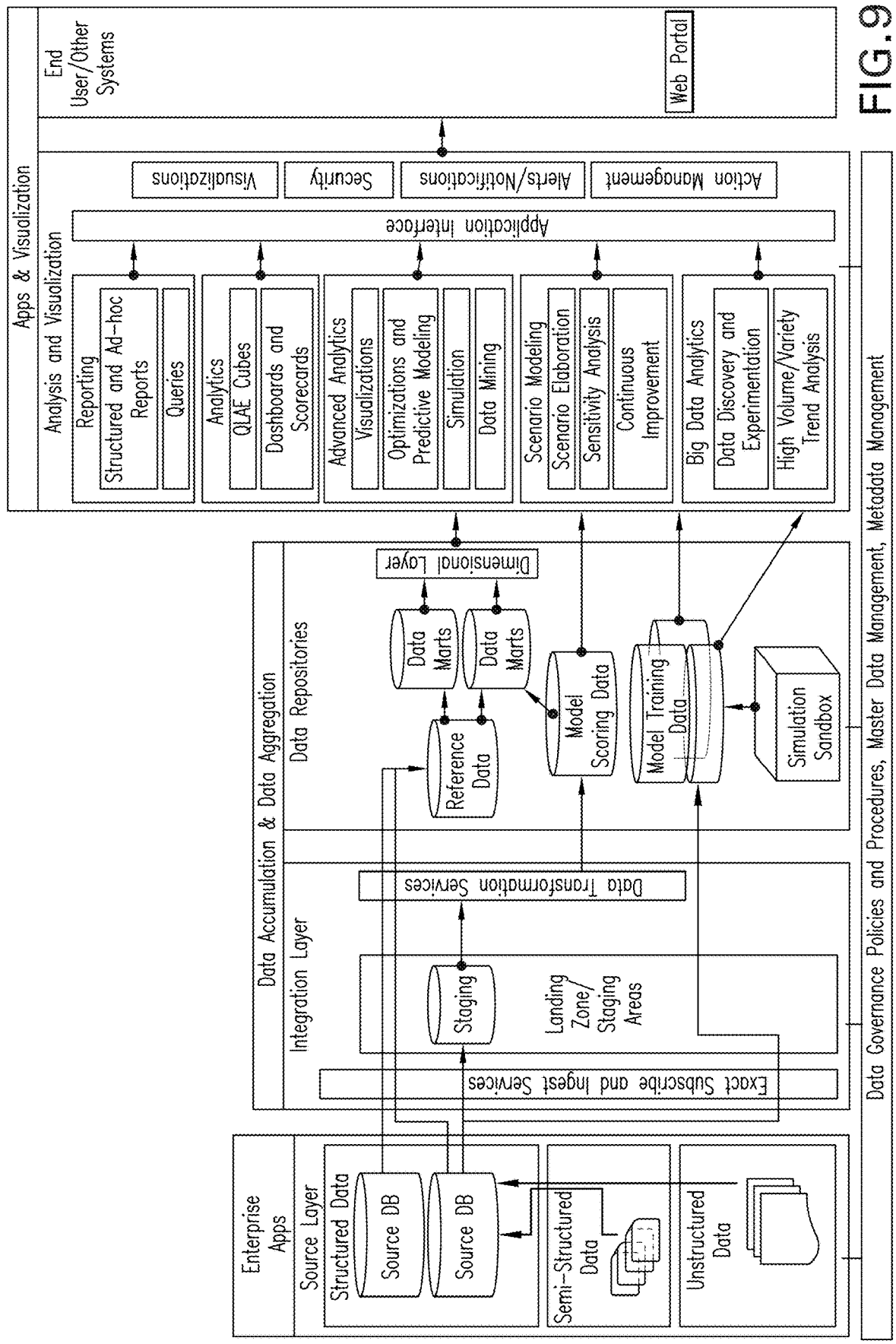
Figure 10:
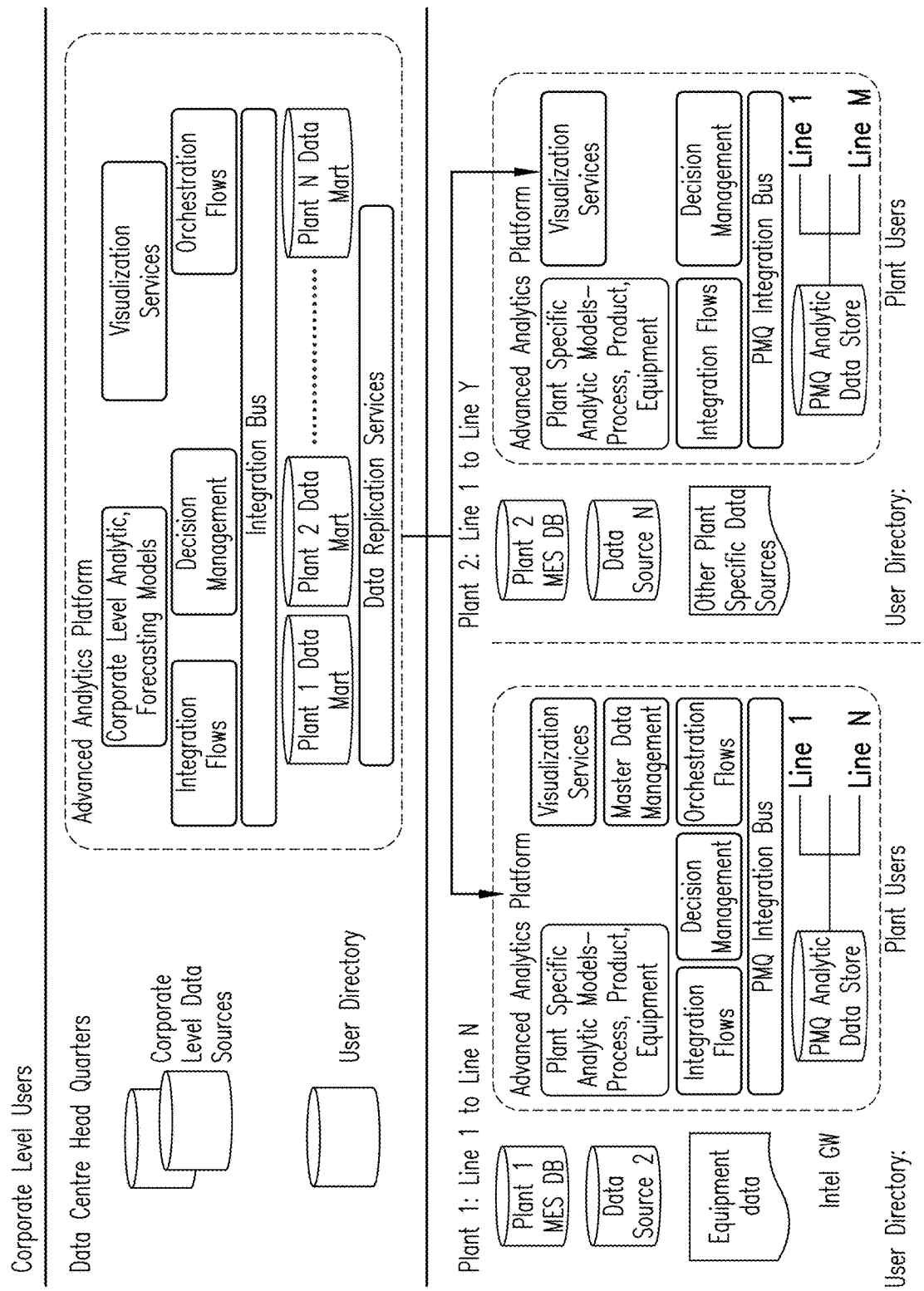

FIG. 7 illustrates with particularity a block diagram of the particular aspects of individual layers discussed with respect to FIG. 1. This is further illustrated with respect to the flow diagram of FIG. 8. An integration diagram illustrating integration of the predictive analytics stack indicated in the examples of FIGS. 7 and 8 is provided in the examples of FIG. 9, and is provided for multiple plants in the example of FIG. 10.

Figure 11:
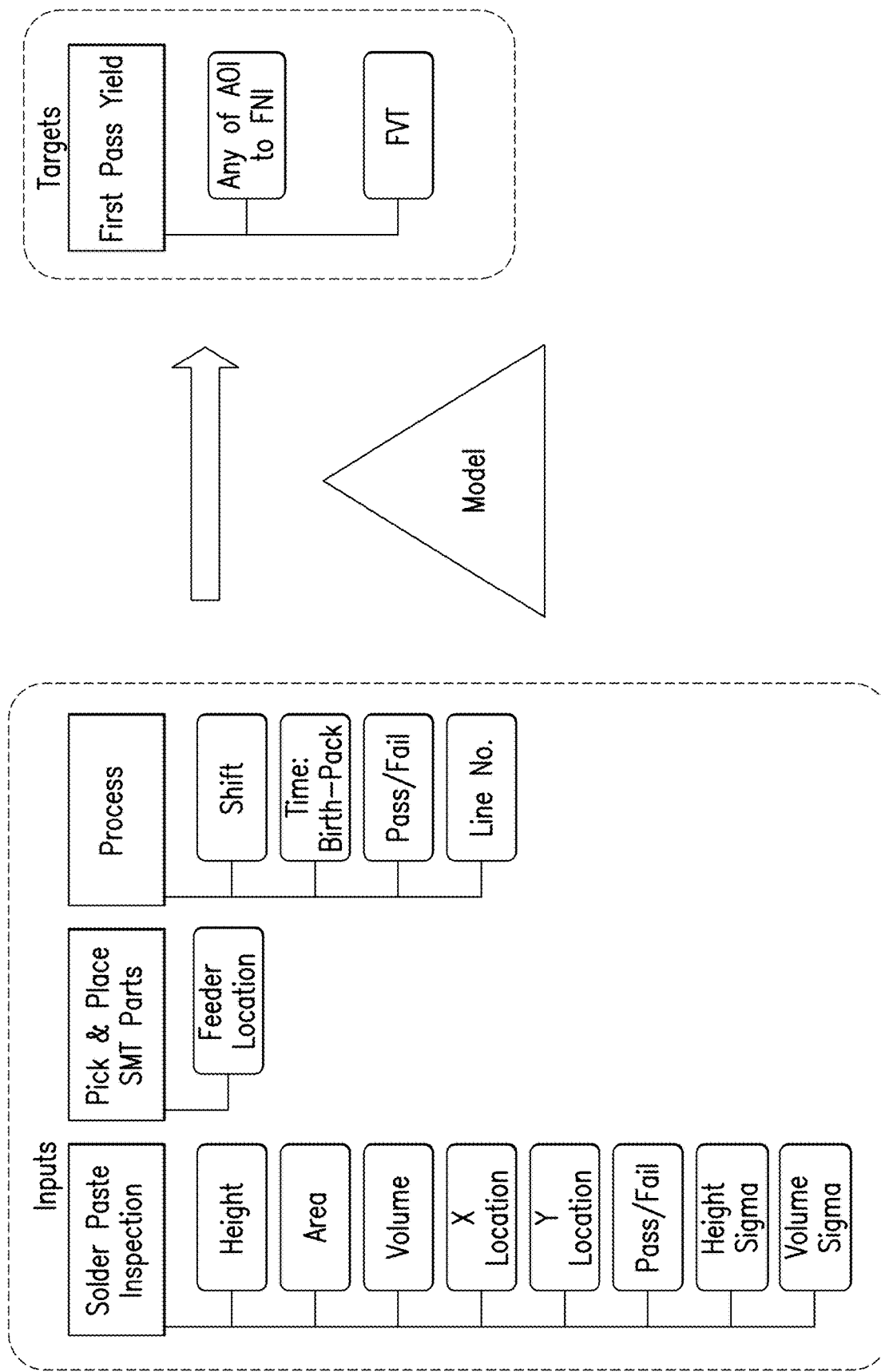
Figure 12:
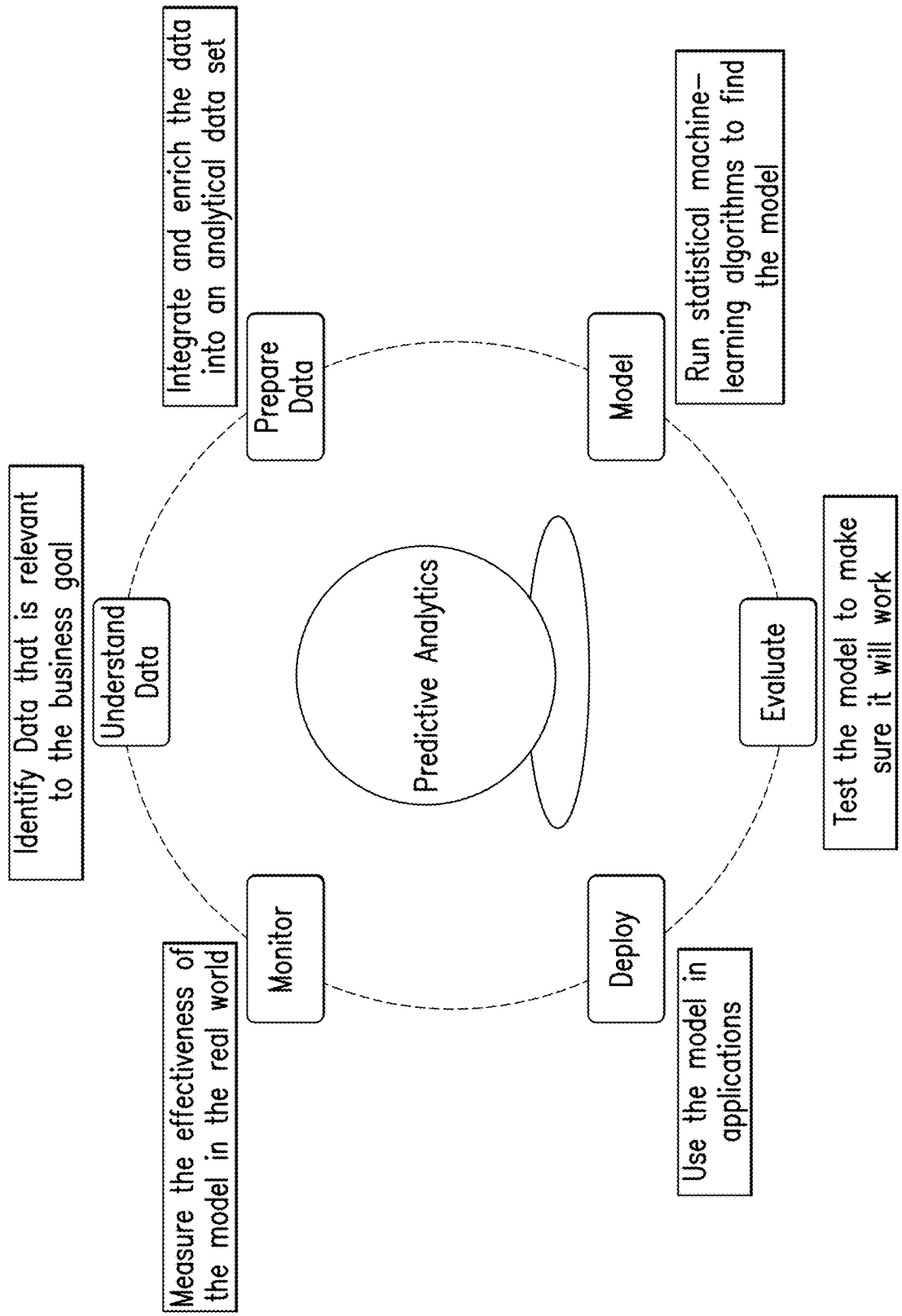
Figure 13:
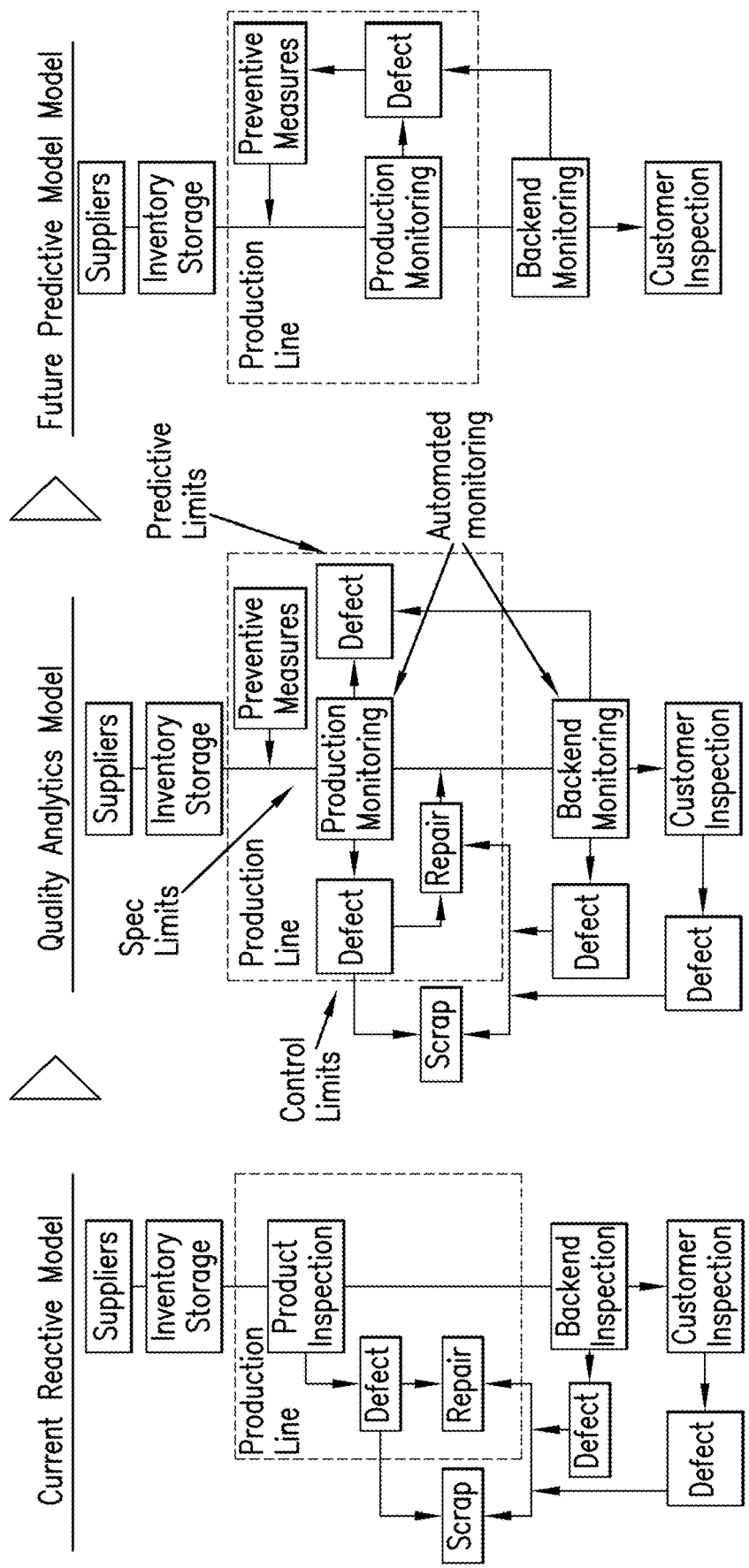

FIG. 11 illustrates, by way of example, inputs of historic data to enable analytics that will employ feedback to generate real time decisions. In the illustration, a first pass yield target is provided against which the data input is run through a model to assess compliance. Thereafter, analytics may indicate modification of certain process parameters in order to better generate a yield in accordance with the target, or to assess likely failures that will contribute to non-compliance with the target in the future. That is, and as further illustrated in FIG. 12, a feedback loop may be generated using the predictive analytics, in which data is accumulated and prepared, fed through a model, evaluated with respect to the model, deployed via the model, monitored as to the effectiveness of the model, identified as relevant to the stated goal of the model, and then modified from a dataset standpoint (which obviously indicates modification of machine performance) to ultimately improve compliance with the model targets. Accordingly, and as illustrated in FIG. 13, therefrom is generated a hybrid of reactive and predictive models, in which feedback is used through the analytics layer module of the instant embodiments to generate a predictive model of future performance, which contributes to modification of current machines from the then-active reactive model.

Figure 14:
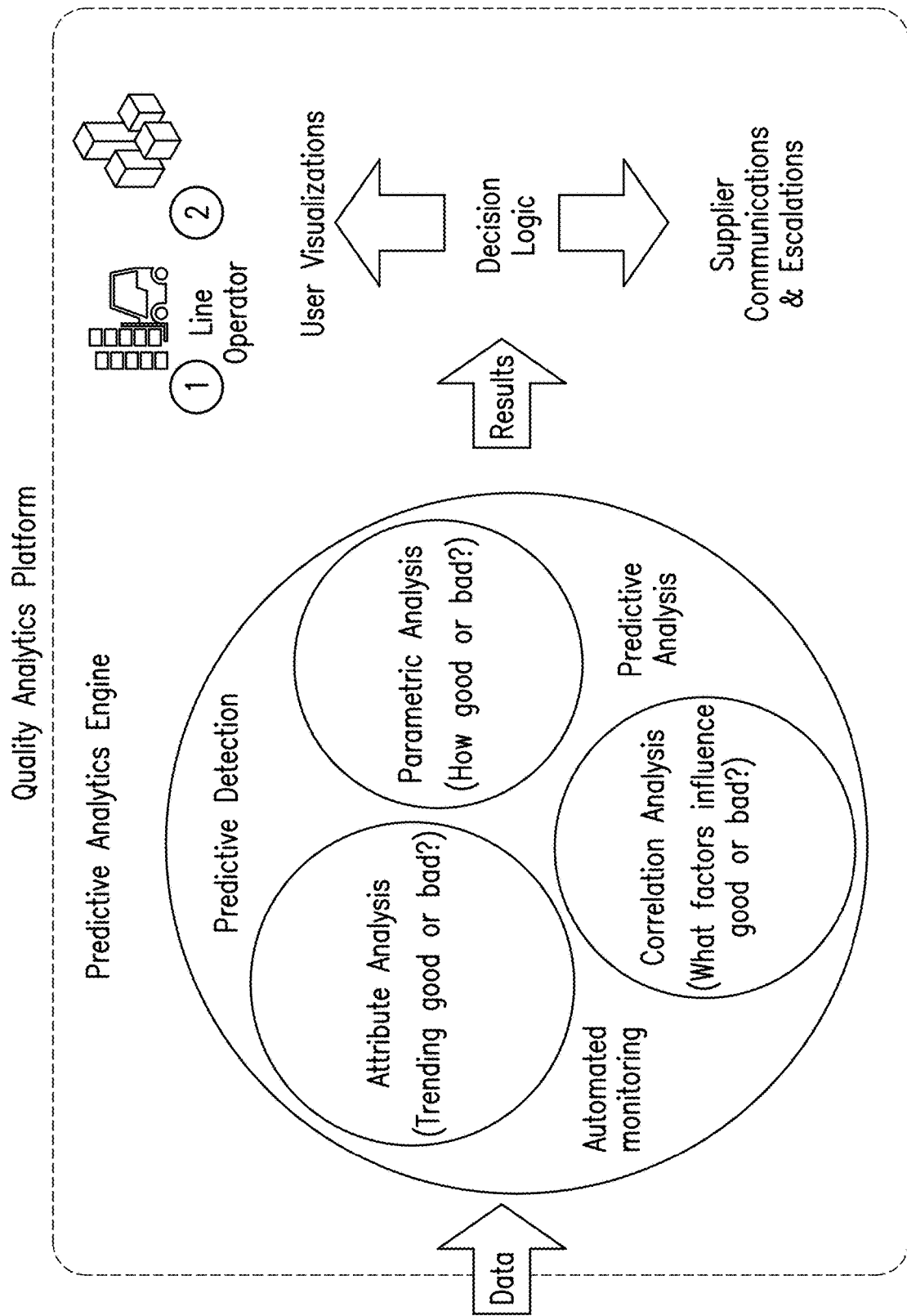
Figure 15:
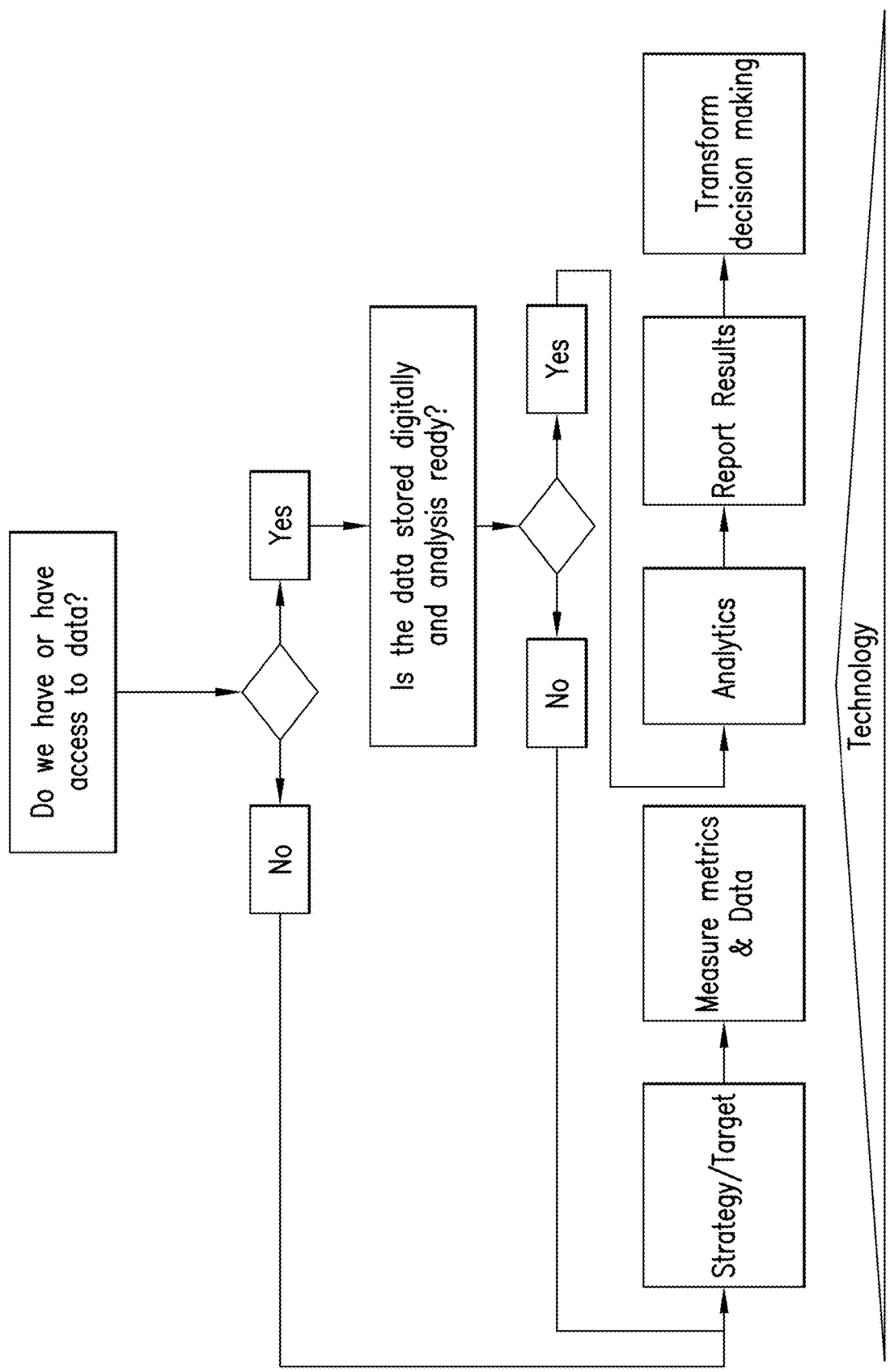

FIG. 14 illustrates the use of the analytics platform to generate user visualizations to line operators and quality engineers, as discussed above with respect to FIG. 5. In the illustration, factor analysis and trend analysis is used to predict quality outcomes, and decision logic is employed to generate alerts and modifications to maintain quality targets. An exemplary flow of such a model is illustrated in FIG. 15. An exemplary flow of the decision-making modifications indicated by FIG. 15 is illustrated in the example of the flow of FIG. 16. Of note, FIG. 16 may be overlayed with the process flow illustrated in FIG. 5.

Figure 16:
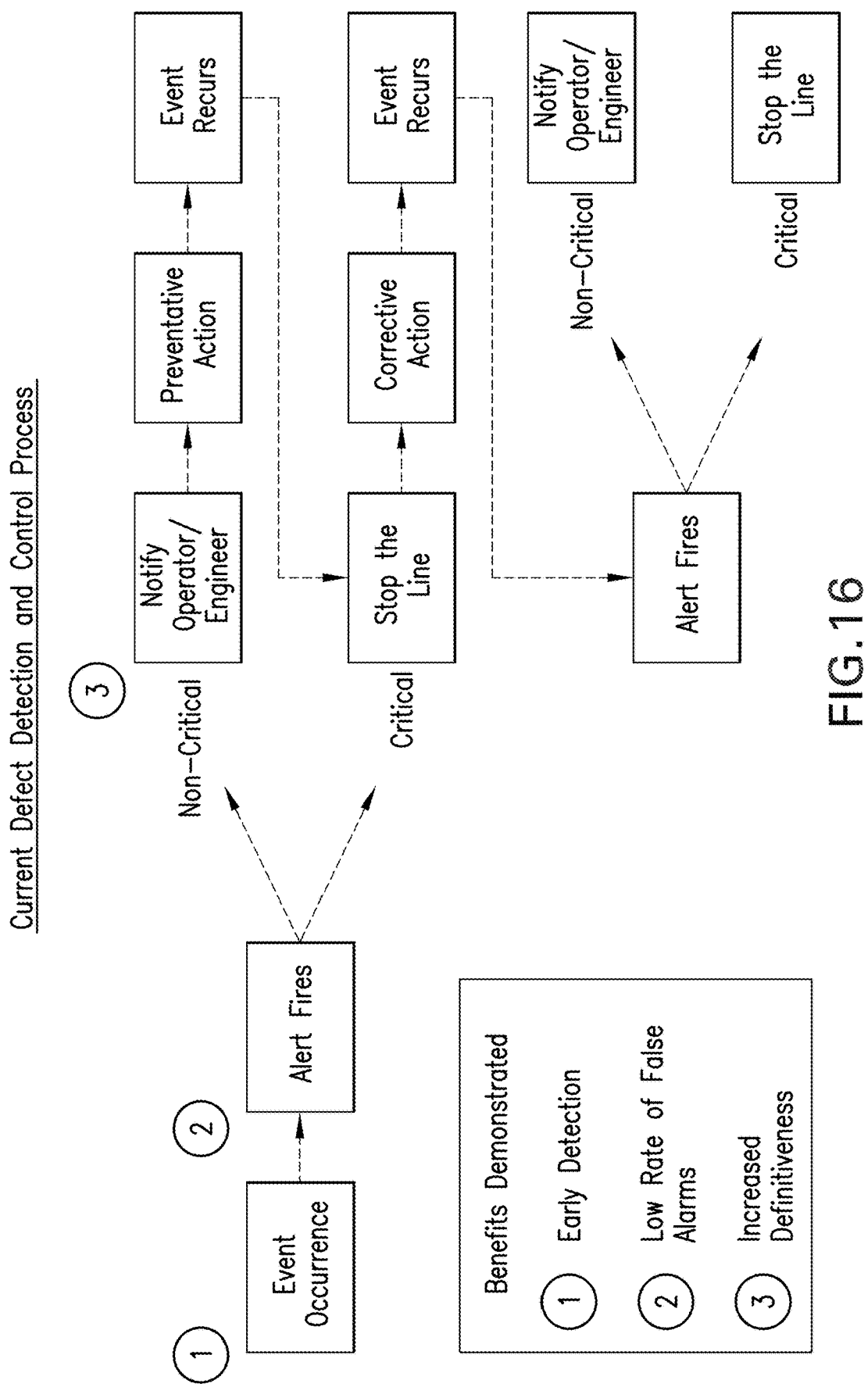

As illustrated in FIG. 16, upon learning of an event or likely event, an alert may be generated. Such alerts may be delineated by critical and non-critical alerts, which delineation may be based on likely global effect of, for example, line performance. Thereby, part of the analytics may be a correlation analysis that identifies the components with the greatest significance for failures, or with the greatest impact upon failure, in a given line or facility. The focus of the analytics models discussed herein may then be placed on these particular machines or components in order to have the greatest impact on uptime and quality, by way of non-limiting example.

Figure 17:
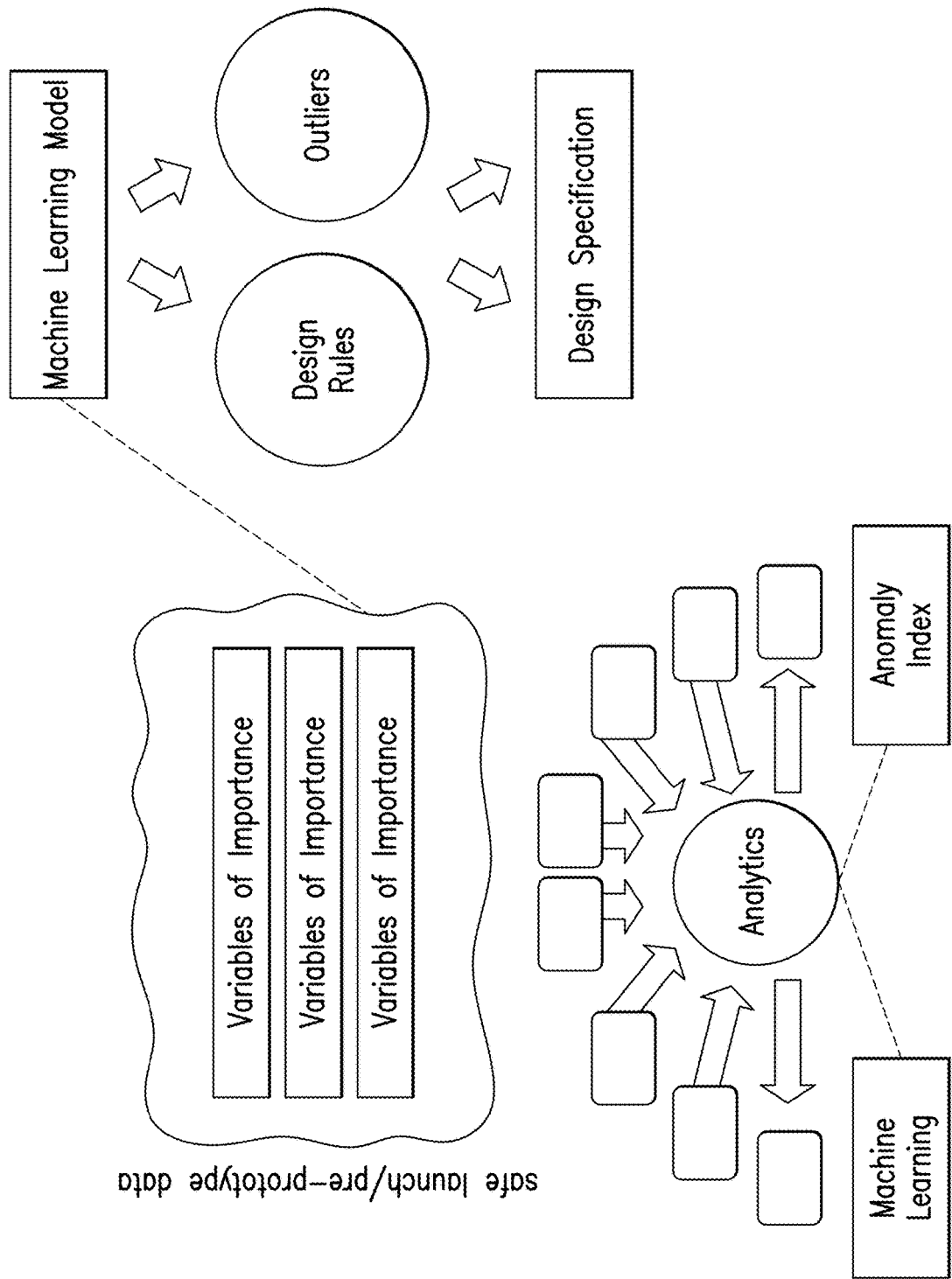
Figure 18:
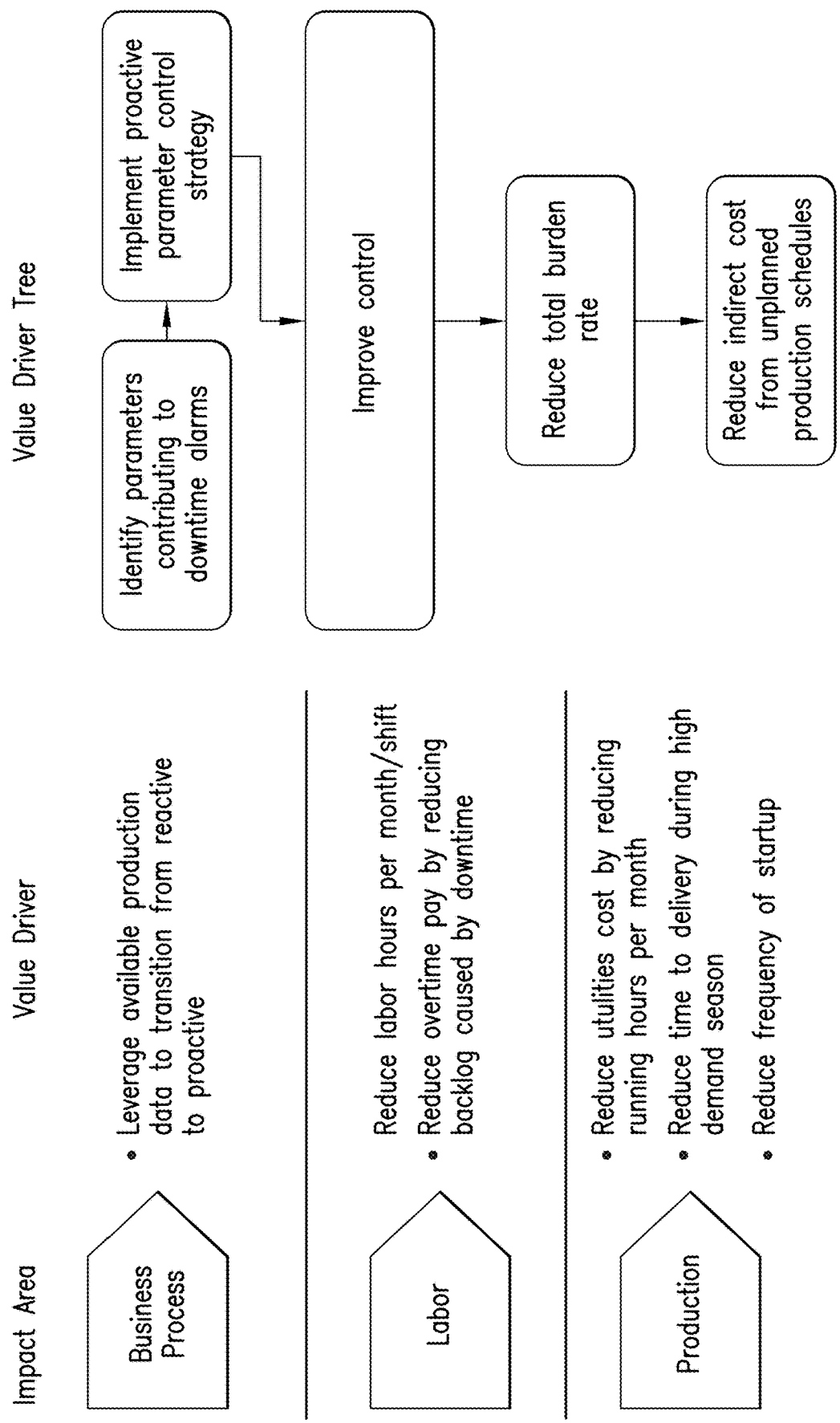

Thus may be generated the variable or information value diagram of FIG. 17. More particularly, the discussed analytics may allow for an assessment of variables of importance, wherein the importance may be assessed based on the respective effect of the variables on targets input to a performance model. The machine learning model may learn which variables are these variables of importance based on both input rules and actual machine performance data. FIG. 18 is a value tree illustrating the effect that certain value targets are subjected to by certain variable modifications. These value targets may be interpreted according to any number of variables assessed to have predictive contributions that must be interpreted by the modeling system from raw machine data. This is illustrated with respect to FIG. 19.

Figure 19:
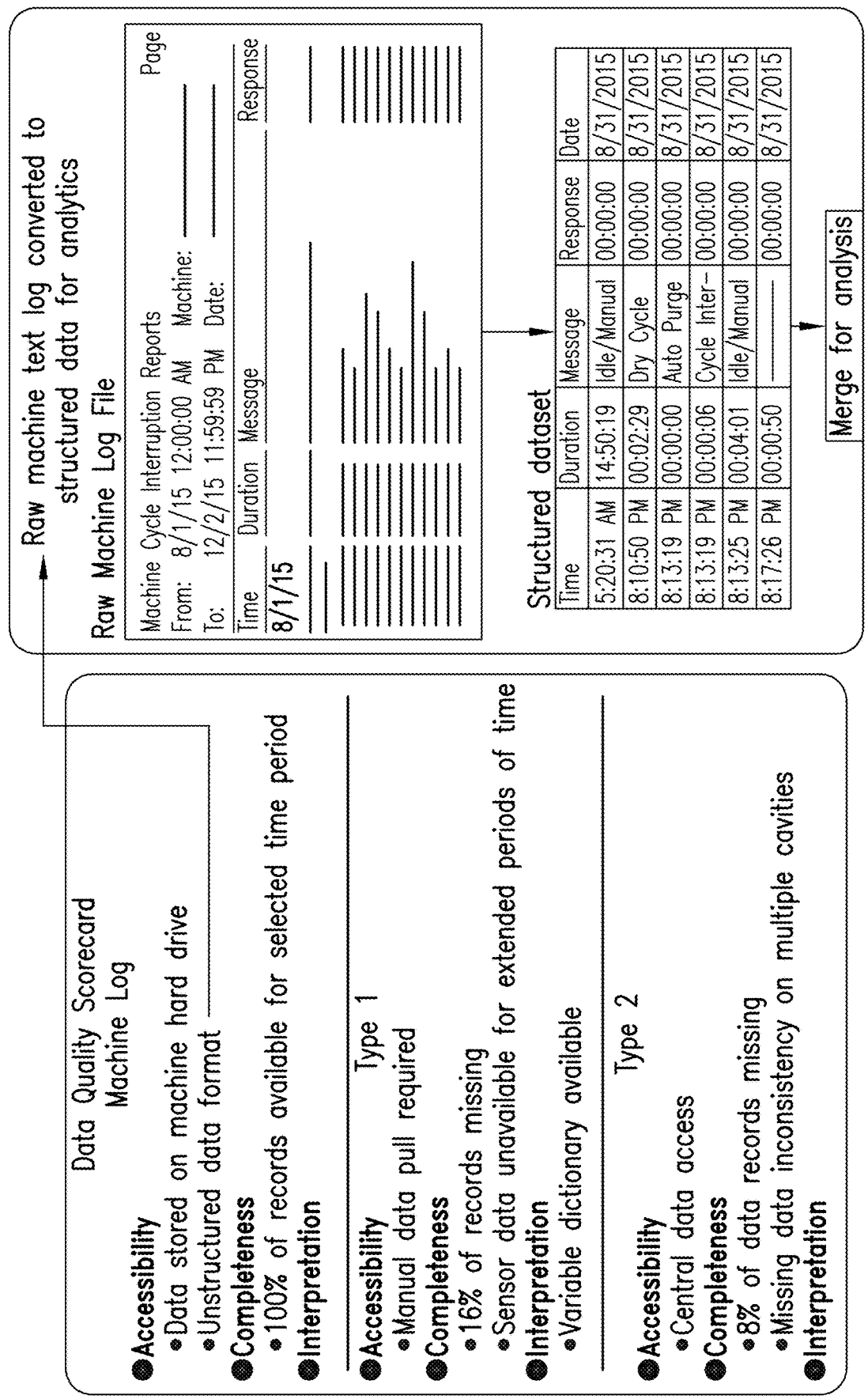
Figure 20:
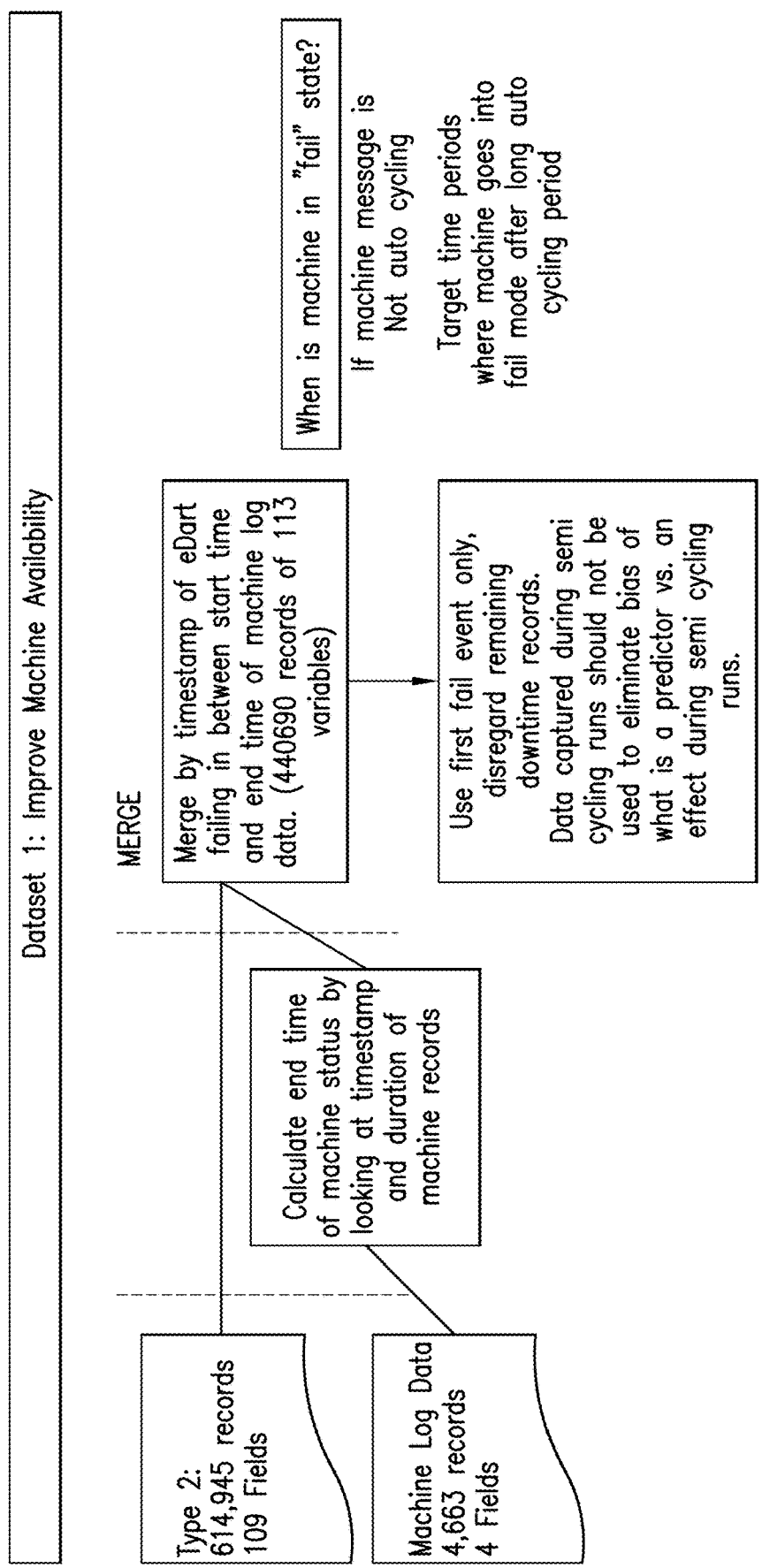

Of note, the flow of FIG. 19 is indicative of the stack model provided in FIG. 1, at least in that the raw machine data is accumulated, is converted to structured data, is subjected as a structured dataset for analysis by the analytics tool, and is ultimately reported for decision-making. Moreover, as illustrated in FIG. 19, the raw machine data itself may be subjected to analysis in order to make assessments of optimized data for entry into the analytics tool. The integration of an exemplary dataset is illustrated with respect to FIG. 20, in which rapid analytics are applied to an integrated dataset in order to improve machine availability.

Figure 21:
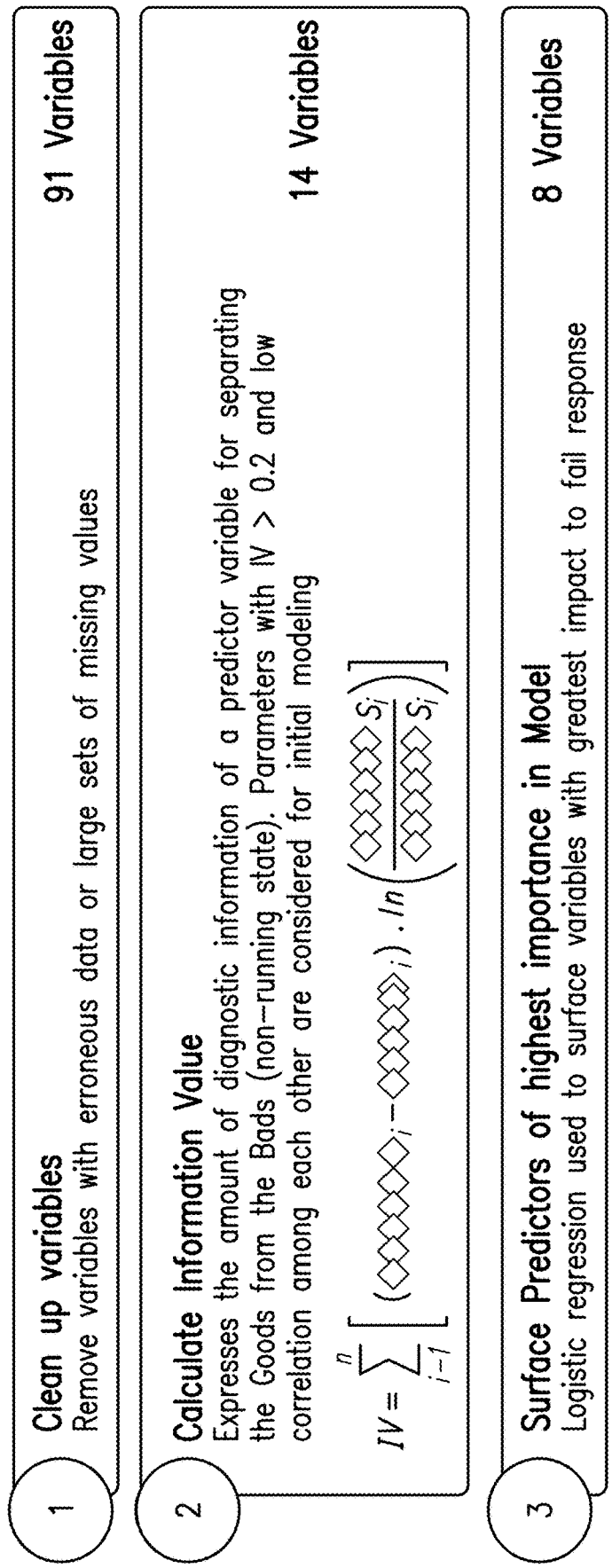
Figure 21:
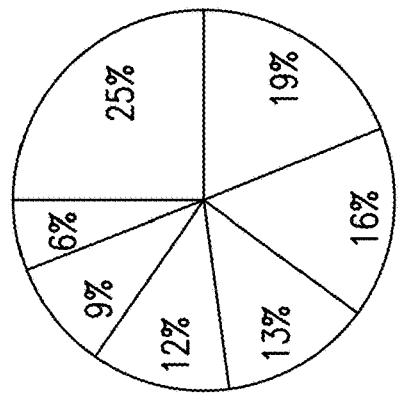
Figure 22:
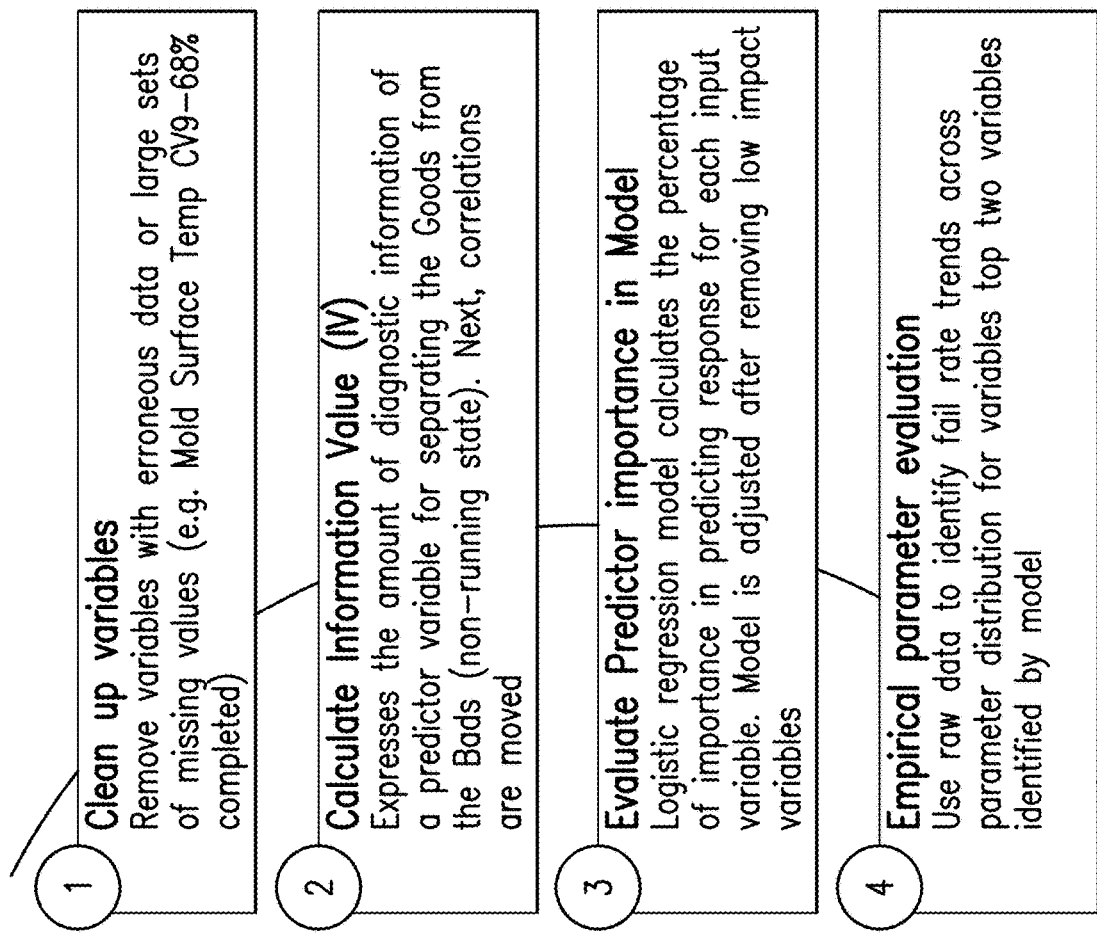
Figure 22:
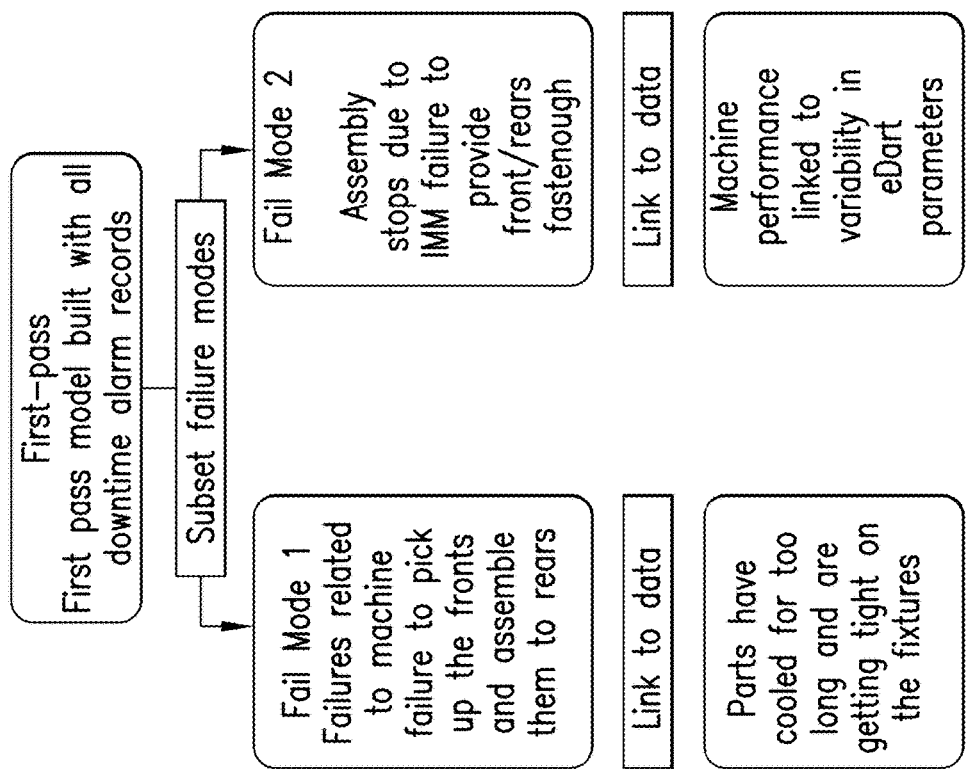

As mentioned throughout, FIG. 21 illustrates a calculation of the information value of particular variables based on the predictive strength of those variables in an input model. This is further illustrated with respect to FIG. 22.

Figure 23:
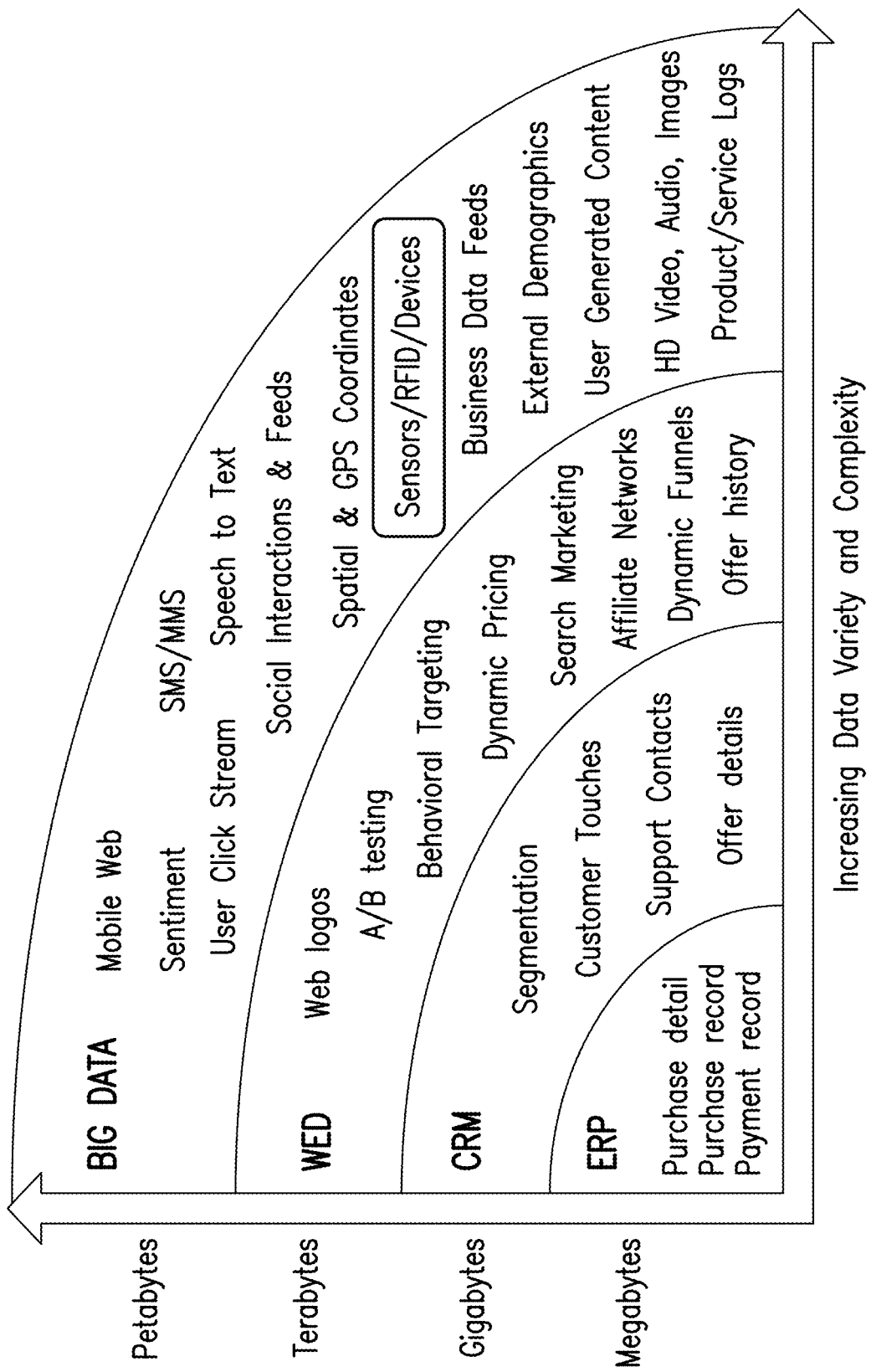
Figure 24:
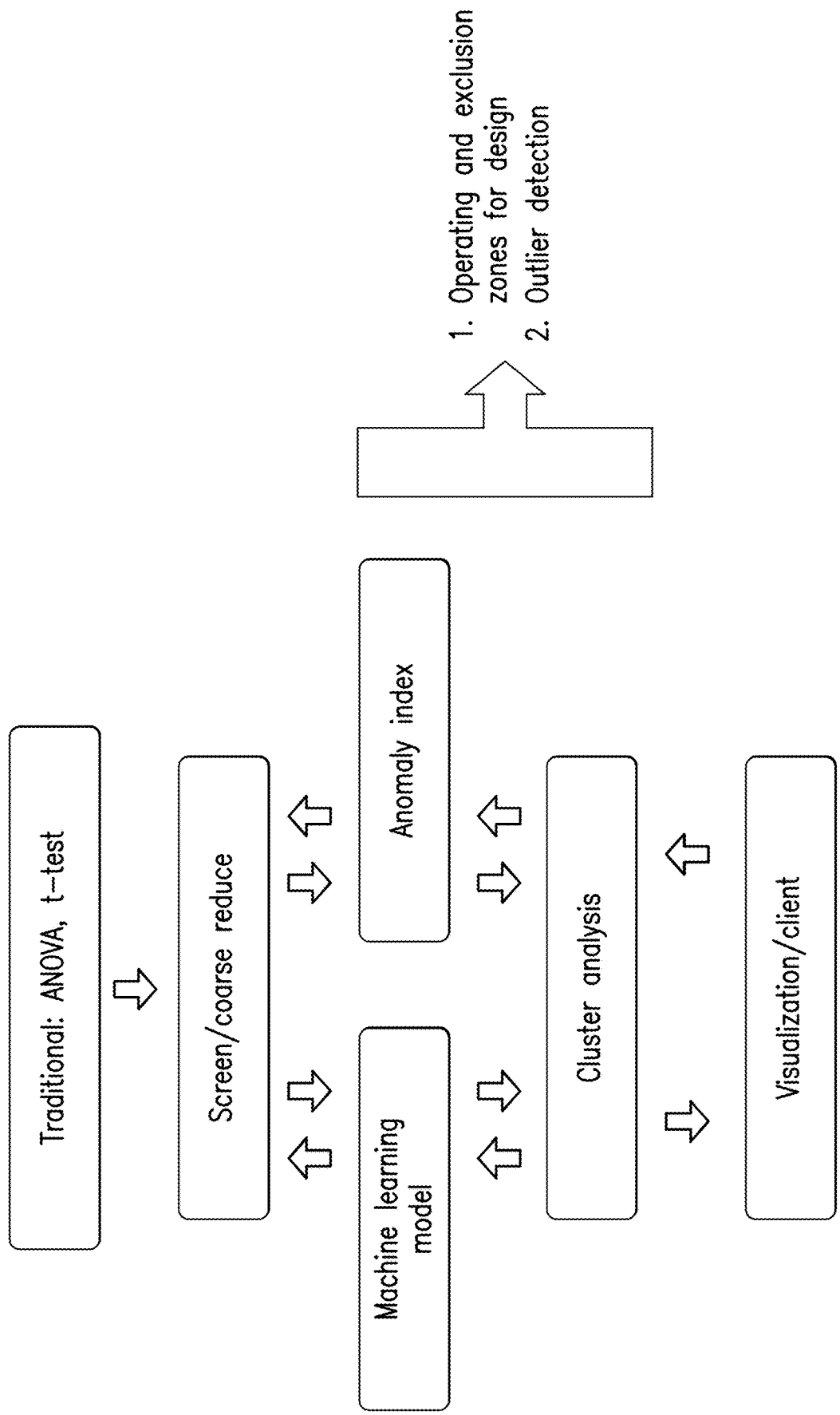

Needless to say, the accumulation of the foregoing, particularly across multiple lines and/or multiple facilities, contributes to the accrual of so-called big data. This is further illustrated with respect to FIG. 23. In fact, the size of the dataset leads to difficulties in prior art embodiments. For example, there are a great many available multivariate combinations, with many opportunities for marginal unit or component failure in a mass production system. For example, such a system may employ thousands of components, thousands of solder points, millions of vias, hundreds of parts, and dozens of suppliers, and although each of the foregoing parameters may be within tolerance independently, the combination of parameters may provide an outlier that is undetectable on an independent unit basis. The inability to detect such issues may contribute to failure and downtime without an assessment of the aggregate dataset, such as through target modeling for an assessment of non-compliance with targets. Accordingly, the present embodiments allow for modeling of such big data, on an individual component and aggregate basis. This may mean that certain unique analyses are performed that are specialized for a big data context, such as cluster analysis of data, data distances, multivariable simultaneous analyses, and the like, as indicated in the flow diagram of FIG. 24.

In an illustrative application of the foregoing, a plastic injection molding process may be used to predict real-time production line failures through machine learning and multi-dimensional data modeling, as disclosed throughout. This may increase yield and decrease scrap rate, for example. The analytics may be directed at various high-value process parameters (shot speed, shot pressure, temperature, viscosity, etc) in the efforts to improve yield and reduce nonconformances.

Thermoplastic injection molding is one of the most prevalent manufacturing processes today. Granular plastic pellets are fed to the injection molding machine, where they are first softened through heating zones, then forced under pressure into the mold. The resulting product is cooled and hardened, then ejected from the mold. Injection molding machines contain three basic units—a hydraulic pressure system for high pressure mold injection, a plasticizing system to heat and soften the plastic, and the mold itself. The heating cylinder, or barrel, incrementally increases heat as the plastic progresses, and is vented so that vapor and trapped air can escape. A screw, powered by an electrical motor and rotating at a specified speed, helps plasticize the pellets and forces them into the mold. The mold is heated to a quench temperature.

Figure 25:
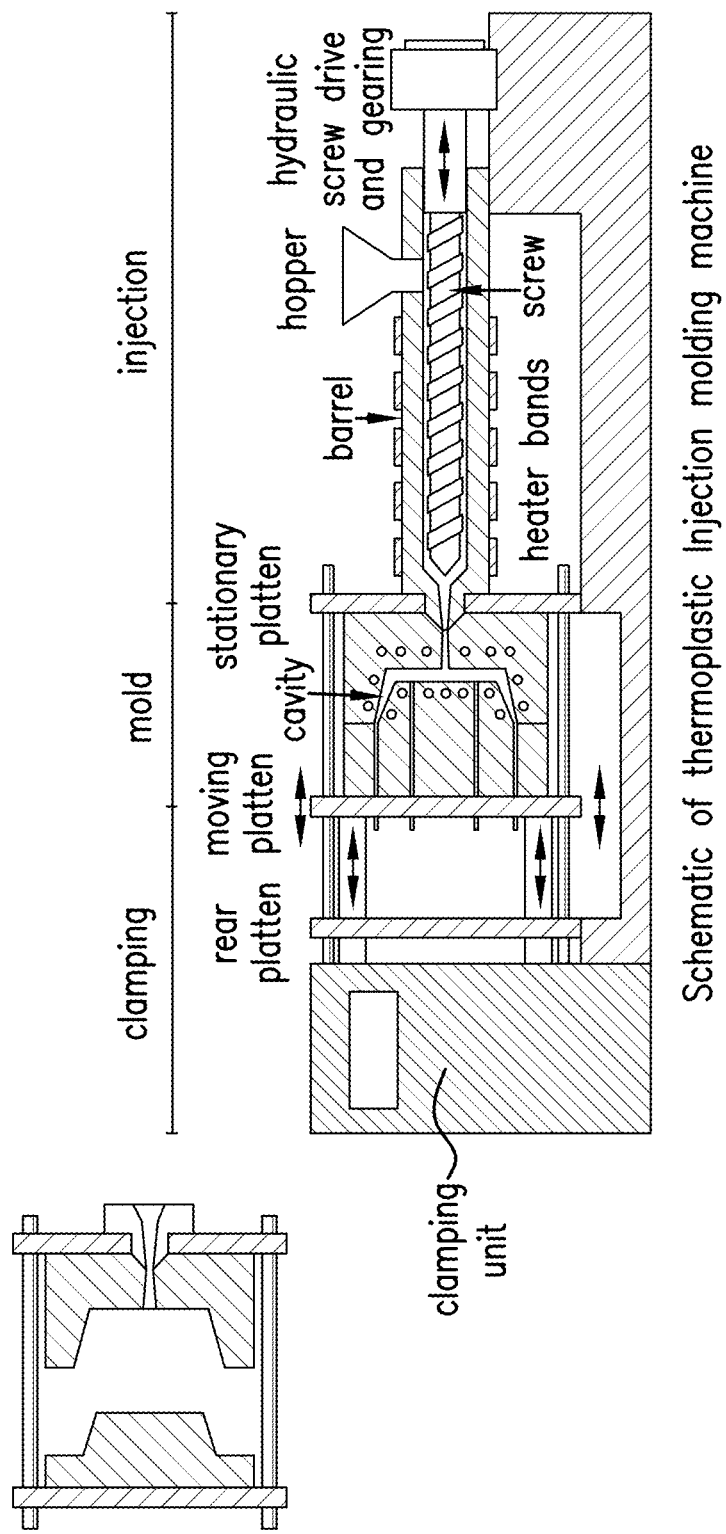

FIG. 25 shows the basic layout of an injection molding process under consideration. Quality and process control is difficult in injection molding because of the large number of interacting variables describing the raw materials, the machinery conditions, the ambient conditions and temporal aspects.

However, the plastic injection molding production process may send real-time process data for an injection molding process, such as in terms of the injection velocity and pack pressure. The size and shape of the process data window may be determined by certain constraining boundaries.

Figure 26:
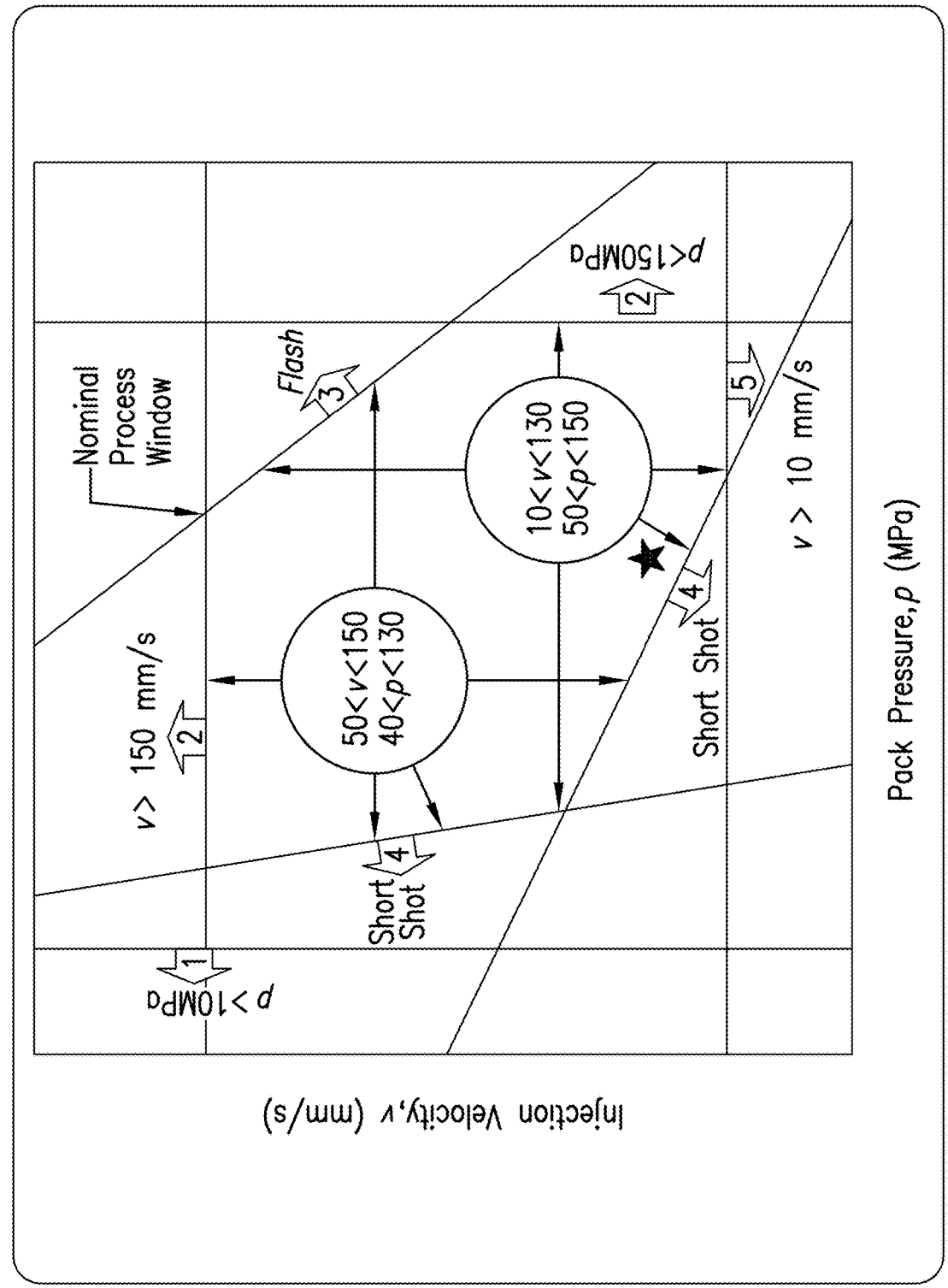

FIG. 26 shows boundaries 1, 2 and 5 defining the machine's injection velocity and pack pressure limits; 3 defines the combined upper limits of injection velocity and pack pressure beyond which unacceptable levels of flash are produced; and 4 determines the lower limits of pack pressure and injection velocity beyond which undesirable short shots and sink marks occur. Viable production processes lie within the process window determined by these boundaries.

Depending on the part geometry and the primary characteristics of concern, different factors or parameters are selected by the analytics discussed herein which would most significantly affect the foregoing concerns, and these analytics may be based, in part, on actual output, and, in part, on predictive output and targets. For example, some defects are very speed sensitive, some are very pressure sensitive, and others are time based or temperature based. When one parameter is moved it affects others, because they are not independent in the injection molding process.

Limits may be set around machine-based parameters, for example, but as the material viscosity changes parameters must be adjusted to maintain a stable part. The results of the standard window studies are based on a material, and thus do not usually take into consideration the conditions seen when the viscosity goes up or down—as it often will.

Control limits are pre-defined, and exceeding control limits may be highly detrimental to product outcomes. However, even approaching control limits with regularity can be detrimental to the manufacturing process. Thus, machine and process control that is yet more refined contributes to great improvement in process outcomes.

For example, process limits can be associated with each process aspect that may contribute to outcome variability. This is the case notwithstanding that the contribution of each process aspect to each negative outcome aspect may not be readily apparent. Accordingly, aspects of the embodiments, such as in accordance with the computing system of FIG. 28, by way of non-limiting example, may provide for machine learning, such as is discussed herein with respect to FIGS. 1, 4 and 17, that ties process aspects to outcome features. By way of example, in certain electronics manufacturing embodiments, humidity during solder reflow may affect the viability of the contacts in the final product over a 6 month horizon. Consequently, the computing system may assess the connection between process humidity and 6 month electrical contact viability, and may set process parameters accordingly. Thereafter, the "outside control limits" may be refined to not only maintain the process more distant from the humidity process control limits at which scrap would exceed the predetermined threshold, but further to allow for maintenance of process control that would improve viability at 6 months, 12 month, or 3 years, by way of example.

Moreover, the skilled artisan will appreciate, in light of the foregoing teaching, that the foregoing aspects do not necessarily mean that the process or the outcome was "out of spec" at any point; rather, the embodiments may provide process refinement and quality improvements even when the manufacturing process is already well-within the specifications limits from the outset.

Thus, the embodiments include both predictive and prescriptive analytics features. These analytics may be, or may be included as an aspect of, the machine learning referenced throughout. These analytics may lead to operation farther from any limits provided by the specifications on a more frequent basis leading to improved process outcomes.

Figure 29:
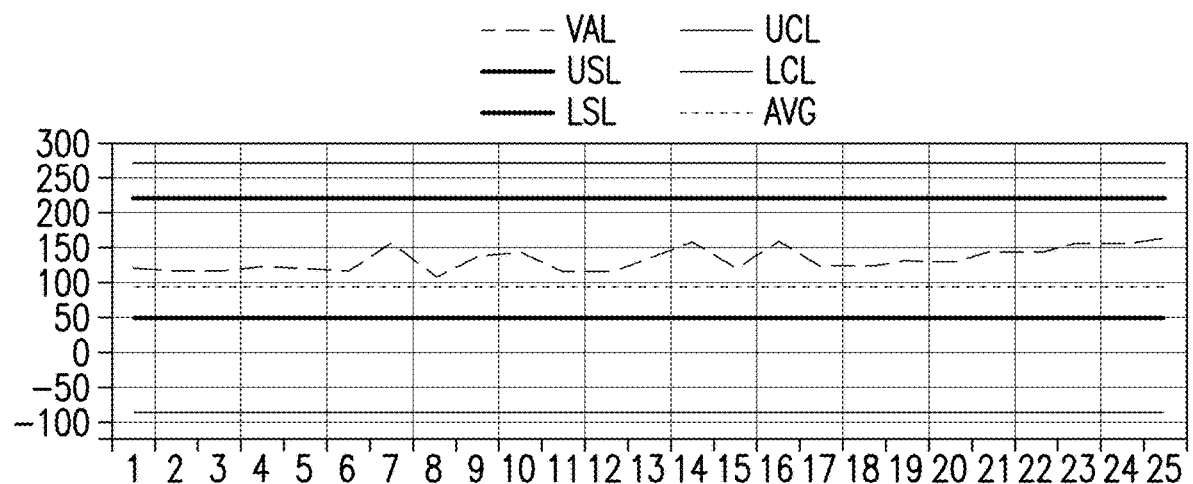
Figure 30:
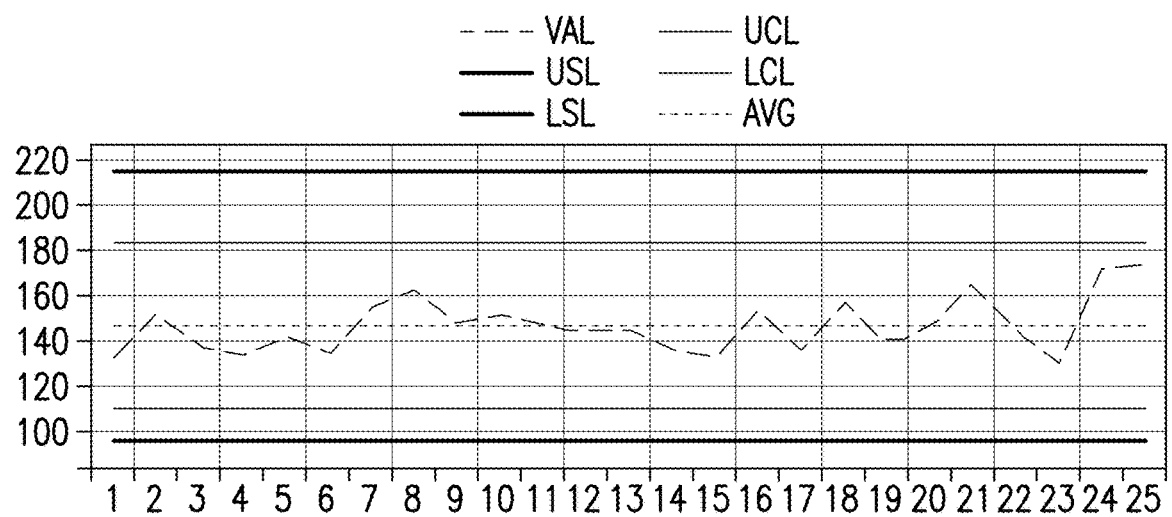

FIGS. 29-32 illustrate various data regarding process operations between predetermined specification thresholds. For example, FIGS. 29-30 illustrate two outer limits (one higher and one lower; one more ideal, and one providing the "outer rails" for acceptable operation within process parameters) for a process parameter, and a center line that is the process parameter target. The varying line is the actual data regarding the process parameter during operation, in accordance with the present embodiments. As shown, the prescriptive and predictive analytics of the embodiments provide for process adjustments that lead to the process parameter during operation being maintained more narrowly about the target line, and thus farther from the four outer thresholds, during process operation.

Figure 31:
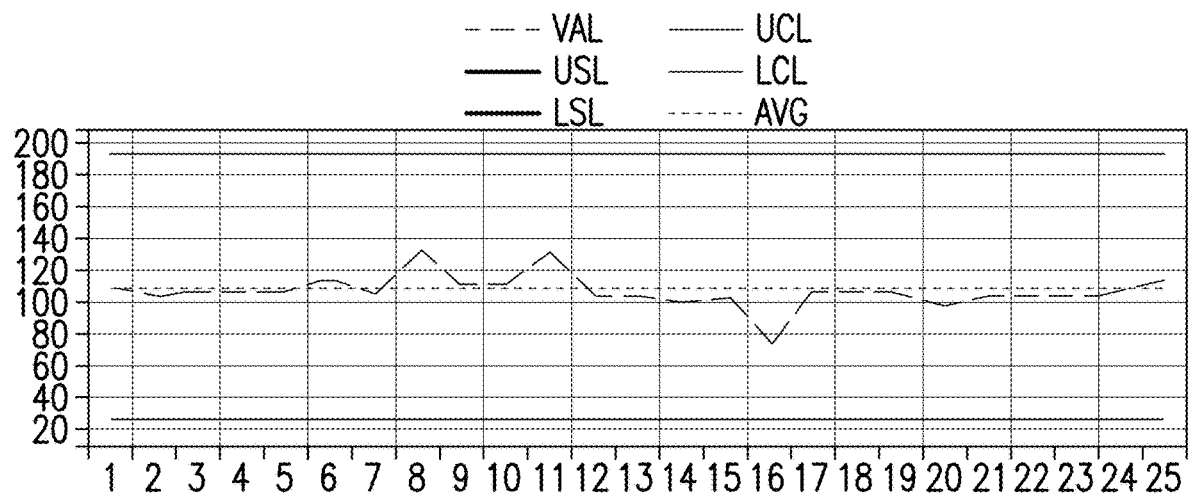
Figure 32:
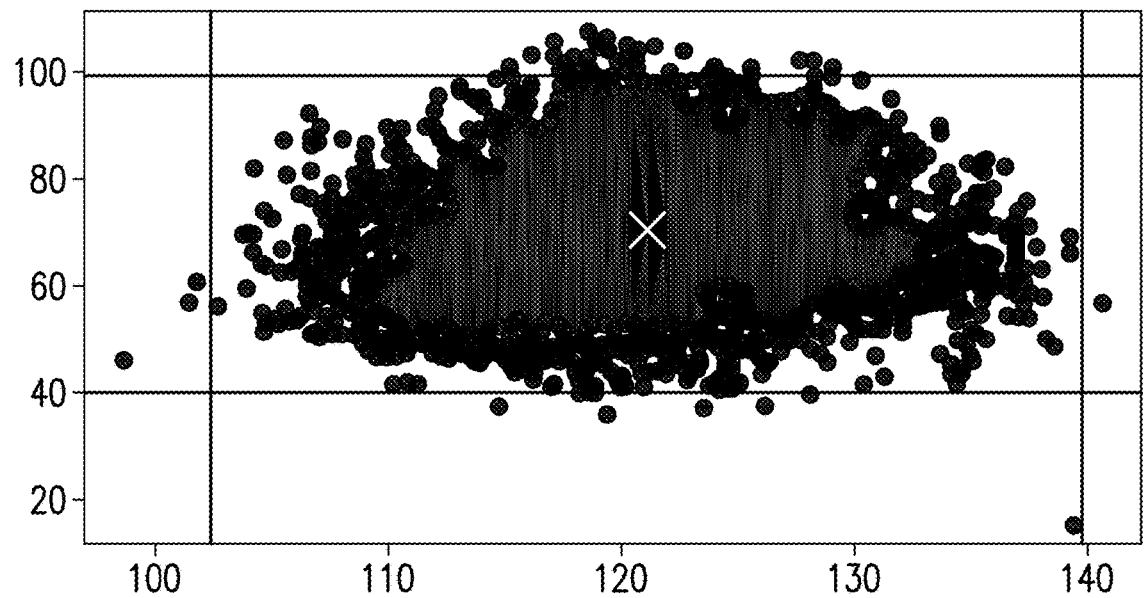

FIG. 31 illustrates a similar embodiment, but with just two "rail conditions" and a target line. In a manner similar to FIGS. 29-30, once more illustrated is the operation of the disclosed process more tightly about the target line and within process parameters. And finally, FIG. 32 is a scatter plot of performance data for the illustrative process aspect. As shown, the embodiments provide that the process aspect is more tightly adhered to the ideal operational point, i.e., between the four "rail condition" lines.

Thus, the predictive analytics engine may provide real time predictive and prescriptive analytics on raw data output from at least one manufacturing machine. The received raw data is compared to an acceptable threshold for operation of the at least one manufacturing machine to perform the manufacturing within targeted output parameters.

The comparison to the threshold is then predictively modelled for a second manufacturing machine by comparing the comparison to the targeted output parameters of the first machine to second targeted output parameters for the second manufacturing machine in order to thereby generate feedback. The feedback includes at least a narrowed fit of the manufacturing to within the targeted output parameters.

Figure 27:
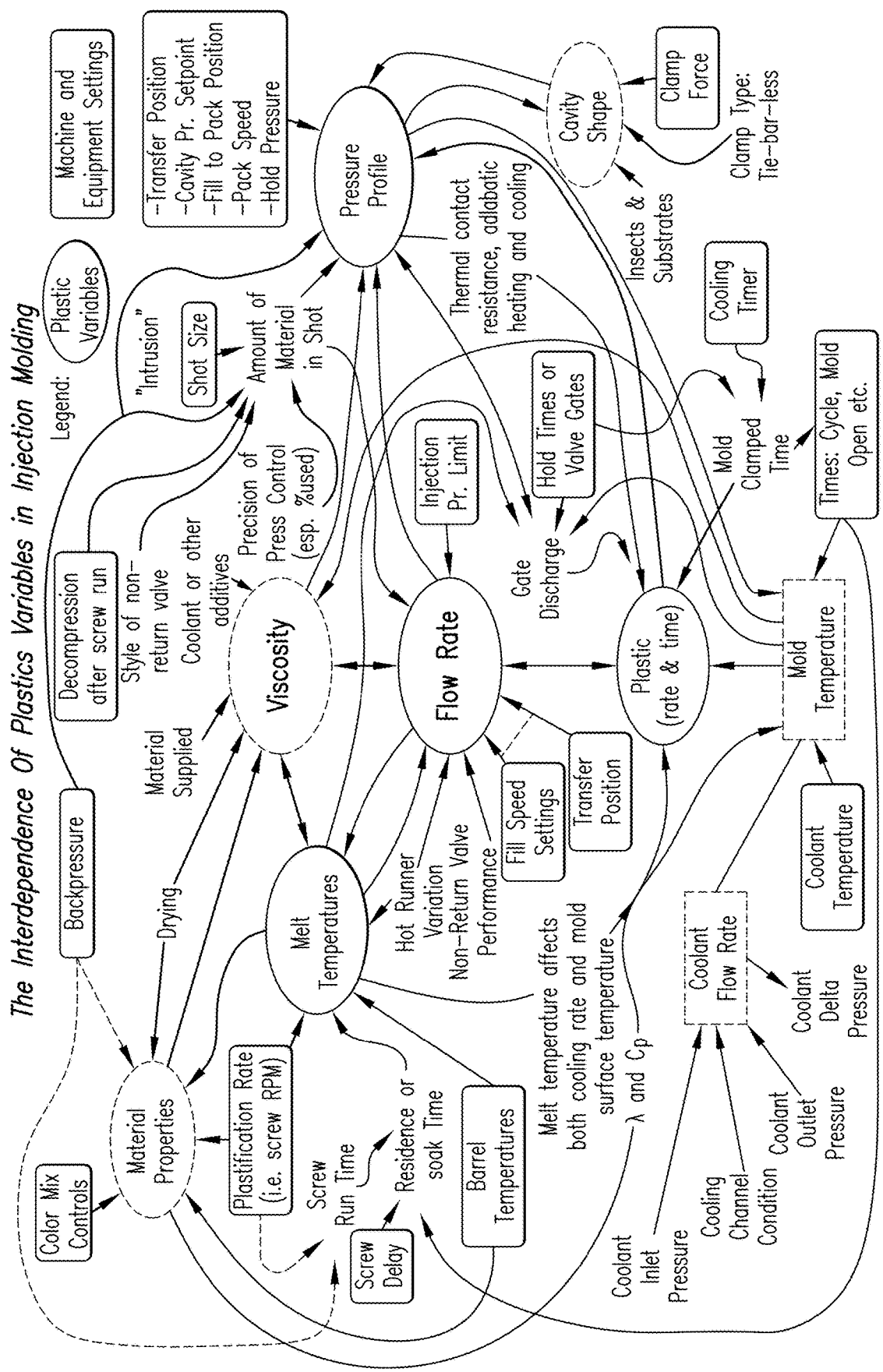

Thus, the analytics discussed herein may allow for a visualization of a balancing of the foregoing and other critical factors to provide real time data monitoring and feedback to obtain optimal injection molding performance. Exemplary critical parameters for plastic injection molding examples are provided below, and are illustrated in FIG. 27:

1. Melt temperature
2. Water temperature
3. First injection transfer—PSI
4. Water temperature
5. Back pressure
6. Cycle time
7. Pack pressure The site operations screen may report each of the aforementioned process steps as a visualization, as discussed throughout, such as reporting plasticization, cooling, clamp open-close, build up, and inject high and low during a cycle, such as during a 14 second cycle by way of non-limiting example. The application software may also have security enabled to prevent data corruption, clean data (no missing values) and correlation that may adversely affect this reporting. The visualization may also be provided using various language optionality, which may be user-selectable, such as providing visualization in English, Chinese or Spanish.

Figure 28:
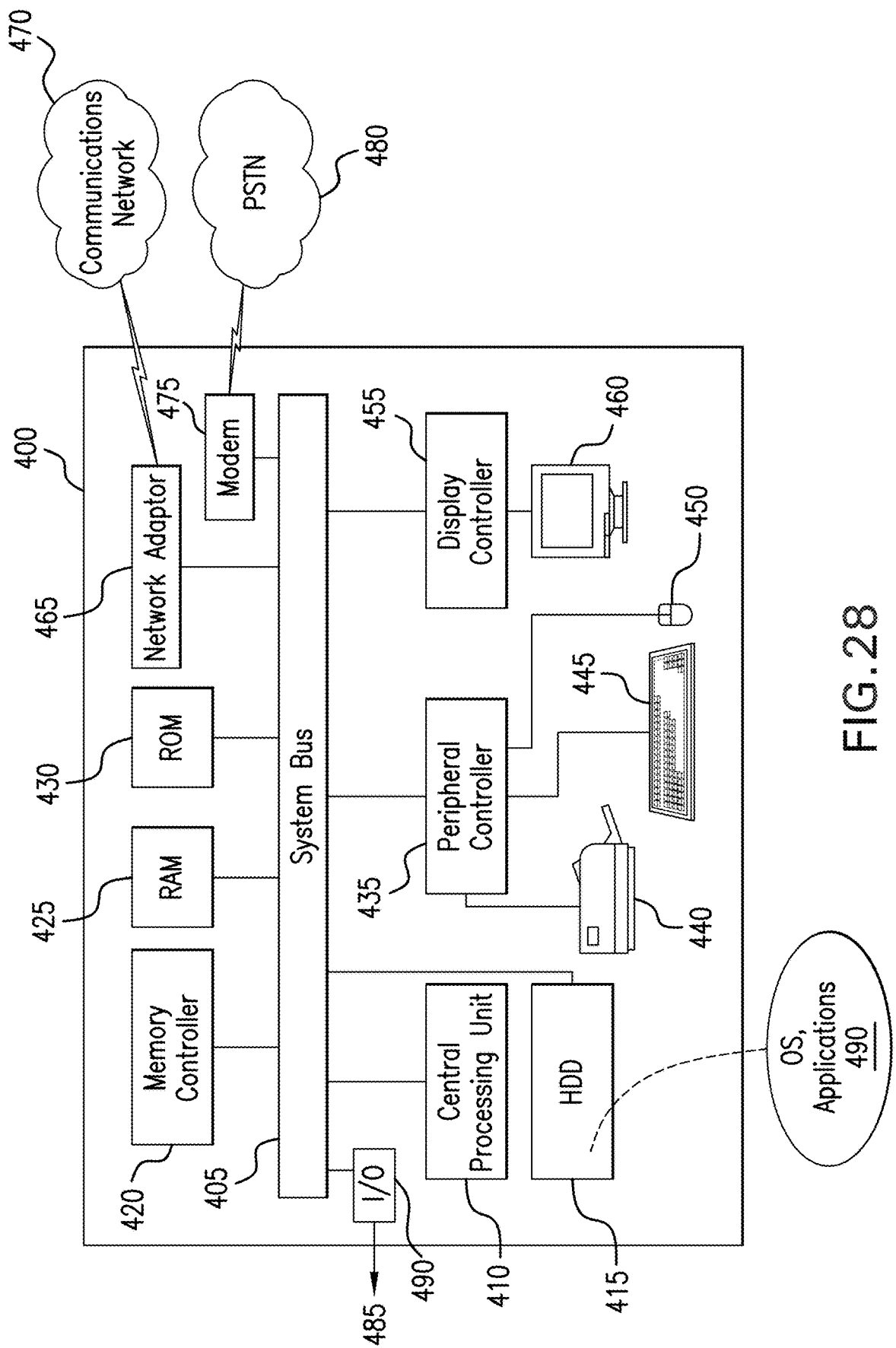

FIG. 28 illustrates an exemplary embodiment of a computer processing system 400 that may be operably employed in embodiments discussed herein, and that may perform the processing and logic discussed throughout. That is, the exemplary computing system 400 is just one example of a system that may be used in accordance with herein described systems and methods. Computing system 400 is capable of executing software, such as an operating system (OS) and one or more computing applications 490. The software may likewise be suitable for operating and/or monitoring hardware, such as via inputs/outputs (I/O), using said applications 490.

The operation of exemplary computing system 400 is controlled primarily by computer readable instructions, such as instructions stored in a computer readable storage medium, such as hard disk drive (HDD) 415, optical disk (not shown) such as a CD or DVD, solid state drive (not shown) such as a USB "thumb drive," or the like. Such instructions may be executed within central processing unit (CPU) 410 to cause computing system 400 to perform the disclosed operations. In many known computer servers, workstations, PLCs, personal computers, mobile devices, and the like, CPU 410 is implemented in an integrated circuit called a processor.

The various illustrative logics, logical blocks, modules, and engines, described in connection with the embodiments disclosed herein may be implemented or performed with any of a general purpose CPU, a digital signal processor (DSP), an application specific integrated circuit (ASIC), a field programmable gate array (FPGA) or other programmable logic device, discrete gate or transistor logic, discrete hardware components, or any combination thereof, respectively acting as CPU 410. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is appreciated that, although exemplary computing system 400 is shown to comprise a single CPU 410, such description is merely illustrative, as computing system 400 may comprise a plurality of CPUs 410. Additionally, computing system 100 may exploit the resources of remote or parallel CPUs (not shown), for example, through local or remote communications network 470 or some other data communications means.

In operation, CPU 410 fetches, decodes, and executes instructions from a computer readable storage medium, such as HDD 415. Such instructions can be included in the software, such as the operating system (OS), executable programs/applications, and the like. Information, such as computer instructions and other computer readable data, is transferred between components of computing system 400 via the system's main data-transfer path. The main data-transfer path may use a system bus architecture 405, although other computer architectures (not shown) can be used, such as architectures using serializers and deserializers and crossbar switches to communicate data between devices over serial communication paths.

System bus 405 may include data lines for sending data, address lines for sending addresses, and control lines for sending interrupts and for operating the system bus. Some busses provide bus arbitration that regulates access to the bus by extension cards, controllers, and CPU 410. Devices that attach to the busses and arbitrate access to the bus are called bus masters. Bus master support also allows multi-processor configurations of the busses to be created by the addition of bus master adapters containing processors and support chips.

Memory devices coupled to system bus 405 can include random access memory (RAM) 425 and read only memory (ROM) 430. Such memories include circuitry that allows information to be stored and retrieved. ROMs 430 generally contain stored data that cannot be modified. Data stored in RAM 425 can generally be read or changed by CPU 410 or other communicative hardware devices. Access to RAM 425 and/or ROM 430 may be controlled by memory controller 420. Memory controller 420 may provide an address translation function that translates virtual addresses into physical addresses as instructions are executed. Memory controller 420 may also provide a memory protection function that isolates processes within the system and that isolates system processes from user processes. Thus, a program running in user mode can normally access only memory mapped by its own process virtual address space; it cannot access memory within another process' virtual address space unless memory sharing between the processes has been set up.

The steps and/or actions described in connection with the aspects disclosed herein may be embodied directly in hardware, in a software module executed by a processor, or in a combination of the two, in communication with memory controller 420 in order to gain the requisite performance instructions. That is, the described software modules to perform the functions and provide the directions discussed herein throughout may reside in RAM memory, flash memory, ROM memory, EPROM memory, EEPROM memory, registers, a hard disk, a removable disk, a CD-ROM, or any other form of storage medium known in the art. Any one or more of these exemplary storage medium may be coupled to the processor 410, such that the processor can read information from, and write information to, that storage medium. In the alternative, the storage medium may be integral to the processor. Further, in some aspects, the processor and the storage medium may reside in an ASIC. Additionally, in some aspects, the steps and/or actions may reside as one or any combination or set of instructions on an external machine readable medium and/or computer readable medium as may be integrated through I/O port(s) 485, such as a "flash" drive.

In addition, computing system 400 may contain peripheral controller 435 responsible for communicating instructions using a peripheral bus from CPU 410 to peripherals and other hardware, such as printer 440, keyboard 445, and mouse 450. An example of a peripheral bus is the Peripheral Component Interconnect (PCI) bus.

One or more hardware input/output (I/O) devices 485 may be in communication with hardware controller 490. This hardware communication and control may be implemented in a variety of ways and may include one or more computer busses and/or bridges and/or routers. The I/O devices controlled may include any type of port-based hardware (and may additionally comprise software, firmware, or the like), such as the disclosed sensors, gantry arm, loader/unloader, gantry, and other inputs/outputs, and can also include network adapters and/or mass storage devices from which the computer system 400 can send and receive data for the purposes disclosed herein. The computer system 400 may thus be in communication with the Internet or other networked devices/PLCs via the I/O devices 485 and/or via communications network 470.

Display 460, which is controlled by display controller 455, may optionally be used to display visual output generated by computing system 400. Display controller 455 may also control, or otherwise be communicative with, the display. Visual output may include text, graphics, animated graphics, and/or video, for example. Display 460 may be implemented with a CRT-based video display, an LCD-based display, gas plasma-based display, touch-panel, or the like. Display controller 455 includes electronic components required to generate a video signal that is sent for display.

Further, computing system 400 may contain network adapter 465 which may be used to couple computing system 400 to an external communication network 470, which may include or provide access to the Internet, and hence which may provide or include tracking of and access to the process data discussed herein. Communications network 470 may provide user access to computing system 400 with means of communicating and transferring software and information electronically, and may be coupled directly to computing system 400, or indirectly to computing system 400, such as via PSTN or cellular network 480. For example, users may communicate with computing system 400 using communication means such as email, direct data connection, virtual private network (VPN), or other online communication services, or the like. Additionally, communications network 470 may provide for distributed processing, which involves several computers and the sharing of workloads or cooperative efforts in performing a task. It is appreciated that the network connections shown are exemplary and other means of establishing communications links between multiple computing systems 400, and/or with remote users, may be used.

It is appreciated that exemplary computing system 400 is merely illustrative of a computing environment in which the herein described systems and methods may operate, and thus does not limit the implementation of the herein described systems and methods in computing environments having differing components and configurations. That is, the inventive concepts described herein may be implemented in various computing environments using various components and configurations.

Those of skill in the art will appreciate that the herein described apparatuses, engines, devices, systems and methods are susceptible to various modifications and alternative constructions. There is no intention to limit the scope of the invention to the specific constructions described herein. Rather, the herein described systems and methods are intended to cover all modifications, alternative constructions, and equivalents falling within the scope and spirit of the disclosure, any appended claims and any equivalents thereto.

What is claimed is:

1. A predictive analytics engine capable of providing real time analytics in a manufacturing system, comprising:
    a data input to a processing system including at least one processor, the data input capable of receiving raw data output from at least one manufacturing machine operable to effect manufacturing in the manufacturing system;
    the at least one processor being associated with a computing memory and being suitable for executing non-transitory code from the computing memory, the execution of the code causing to occur the steps of:

providing the received raw data to one or more databases stored in the computing memory which relationally form processed data comprising a proximity of the received raw data to an acceptable threshold for operation of the at least one manufacturing machine to perform the manufacturing within targeted output parameters;

extracting the processed data from the one or more databases upon identification of a type of a second manufacturing machine equivalent to the at least one manufacturing machine from which was received the raw data;

predictively modelling the extracted processed data by applying thereto at least one predictive model comprised of second targeted output parameters for the second manufacturing machine to thereby generate feedback related to a type of the at least one and the second manufacturing machines, the feedback including at least a narrowed fit of the manufacturing within the targeted output parameters;

directly modifying performance of the second and the at least one manufacturing machines using an output of the feedback from the predictively modelling; and displaying to a user of at least a visualization of the feedback and of the modified performance.

2. The predictive analytics engine of claim 1, wherein the feedback comprises most critical parameters to meet the targeted output parameters.

3. The predictive analytics engine of claim 1, wherein the targeted output parameters to be met comprise relatively increased yield compared to that in the raw data output and reduced scrap compared to the raw data output.

4. The predictive analytics engine of claim 1, wherein the modified performance comprises a modified build-of-materials.

5. The predictive analytics engine of claim 1, wherein the targeted output parameters comprise a level of line productivity.

6. The predictive analytics engine of claim 1, wherein the predictively modelling and the feedback is iterative.

7. The predictive analytics engine of claim 1, wherein the feedback comprises a pass or fail compared to the targeted output parameters.

8. The predictive analytics engine of claim 1, wherein the data input resides in a device layer.

9. The predictive analytics engine of claim 8, wherein the device layer additionally comprises at least machine-language processing to, in part, provide the identification of the type of the at least one manufacturing machine.

10. The predictive analytics engine of claim 1, wherein the visualization results from a reporting engine suitable to generate one or more reports.

11. The predictive analytics engine of claim 1, wherein the predictively modelling comprises applying a learning app that learns over repeated applications of the at least one predictive model.

12. The predictive analytics engine of claim 11, wherein the predictively modelling iteratively changes over repeated generations of the feedback.

13. The predictive analytics engine of claim 11, wherein the learning app comprises a supervised module.

14. The predictive analytics engine of claim 1, wherein the predictive model includes minimized yield loss.

15. The predictive analytics engine of claim 1, wherein the modifying performance includes increasing production capacity across multiple ones of the at least one manufacturing machines substantially simultaneously.

16. The predictive analytics engine of claim 1, wherein the displaying e visualization comprises a graphical user interface.

17. The predictive analytics engine of claim 16, wherein the graphical user interface is a mobile device interface.

18. The predictive analytics engine of claim 1, wherein the displaying further comprises intercommunicating the visualization between at least ones of cell managers, suppliers, operators, engineers and operations.

19. The predictive analytics engine of claim 18, wherein the intercommunicating comprises indicating production line failures.

20. The predictive analytics engine of claim 18, wherein the intercommunicating comprises publishing system alerts.

* * * * *